United States Patent
Kato et al.

[11] Patent Number: 5,944,291
[45] Date of Patent: Aug. 31, 1999

[54] OBJECT SUPPORTING DEVICE

[75] Inventors: Yoshimasa Kato; Hiroyuki Fukutani, both of Osaka, Japan

[73] Assignee: Kokuyo Co., Ltd., Japan

[21] Appl. No.: 08/952,731

[22] PCT Filed: Nov. 28, 1996

[86] PCT No.: PCT/JP96/03498
  § 371 Date: Nov. 25, 1997
  § 102(e) Date: Nov. 25, 1997

[87] PCT Pub. No.: WO97/39656
  PCT Pub. Date: Oct. 30, 1997

[30] Foreign Application Priority Data
  Apr. 23, 1996 [JP] Japan .................. 8/100771

[51] Int. Cl.⁶ ........................................ B60B 33/04
[52] U.S. Cl. .................. 248/188.2; 16/19; 16/32; 248/188.8
[58] Field of Search ................ 248/688, 188.2, 248/188.8; 16/19, 32, 33

[56] References Cited

U.S. PATENT DOCUMENTS

| | | | |
|---|---|---|---|
| 1,145,096 | 7/1915 | Thomas | 16/32 |
| 1,686,894 | 10/1928 | Buckert et al. | 16/33 |
| 2,176,551 | 10/1939 | Solem | 16/33 X |
| 3,175,641 | 3/1965 | Mihalik | 16/32 |
| 4,077,086 | 3/1978 | Butler | 16/33 |
| 4,103,391 | 8/1978 | Thomsen | 16/33 |
| 4,397,062 | 8/1983 | Huang | 16/33 |
| 4,747,180 | 5/1988 | Screen | 16/33 X |
| 5,347,680 | 9/1994 | Rippe | 16/19 |
| 5,584,546 | 12/1996 | Gurin et al. | 16/19 X |

FOREIGN PATENT DOCUMENTS 62-24751 2/1987 Japan.
1-145226 10/1989 Japan.

*Primary Examiner*—Derek J. Berger
*Attorney, Agent, or Firm*—Banner & Witcoff, Ltd.

[57] ABSTRACT

The device of the invention comprises an adjuster 6 having a supporting end 6a in contact with a floor F to support a foldable table 1 in restrained condition, a caster 7 movable between a retracted position A where the supporting end 7a thereof at least contacts the floor F simultaneously with the supporting end 6a of the adjuster 6 and a projecting position B where the supporting end 7a projects toward the floor F beyond the supporting end 6a of the adjuster 6, and an urging mechanism 80 for urging the caster 7 toward the floor F with a force greater than the gravity acting on the foldable table 1 when the caster 7 is at or adjacent the projecting position and with a force smaller than the gravity acting on the foldable table 1 when the caster 7 is at or adjacent the retracted position.

21 Claims, 25 Drawing Sheets

OBJECT SUPPORTING DEVICE

TECHNICAL FIELD OF THE INVENTION

This invention relates to a novel, useful object supporting device designed to be capable of supporting an object to be supported such as a piece of office furniture and the like selectively in a movable condition and a restrained condition without the need to operate a lever to change the conditions.

TECHNICAL BACKGROUND

Among known supporting devices of this type there is known one which supports a table for use in a conference or the like. The device supports the conference table with a supporter for transport such as casters or sliders, which are associated with a locking mechanism so designed as to put the supporter into a movable condition in which the casters or sliders can rotate or slide and alternatively into a restrained condition in which the movement thereof is locked.

There is known another device which is provided with a supporter for restraint such as adjusters along with the above-mentioned casters or sliders as a supporter for transport, the two kinds of supporters being so arranged by a changing mechanism that one of them is vertically movable relative to the other between a movable position in which only the casters contact the floor and a retracted position in which both the casters and the adjusters simultaneously contact the floor.

With the locking mechanism, however, there arises a problem that since the locking mechanism is provided on the casters or sliders themselves, in order to operate the mechanism the operator must crouch down adjacent the base of the table that is the object being supported, so that the operability of the mechanism is very low. The structure of the changing mechanism must be such that the mechanism is ganged with an operating lever provided at a position suitable for an operator to handle it. To provide the operating lever at a position easy for handling, a complex transmission must be interposed therebetween, with resulting increase in the manufacturing steps and cost.

To solve the problem, in the case of, for example, a foldable table which is provided, in addition to the above-mentioned first changing mechanism, with a second changing mechanism such as a flapping mechanism which is placed in a position for use and alternatively in a position for nonuse, the operation of the second changing mechanism is transferred to the first changing mechanism to operate the same so as to make it unnecessary to operate the first changing mechanism individually.

With this arrangement, however, when the table top is placed in the position for use, the table as a whole has already been fixed so that in order to move the table the table top must be returned to the position for nonuse. Therefore, if many tables are to be arranged side-by-side with their top plates contacting each other in edge-to-edge relation, it is impossible to arrange them with their tops kept in the position for use, so that the working efficiency of arranging the tables is very low. Moreover, the table top must be kept in the position for use in order to keep the table immovable for storage, so that it is difficult to store many tables stably in the unused condition with their tops kept upright in face-to-face relation.

DISCLOSURE OF THE INVENTION

To solve the above problems, the present invention adopts an entirely novel urging mechanism, whereby when the supporter for transport is in the projecting position where it functions effectively, the supporter is supported in that position with the gravity acting on the object being supported having been overcome, and when the supporter for transport has been moved to the retracted position by imposing thereon a force exceeding it so that the supporter for restraint functions effectively, the supporter for transport is supported so as not to be able to return to the projecting position by itself.

In particular, the object supporting device of the invention for supporting an object to be supported selectively in restrained and movable conditions comprises a supporter for restraint fixed to the object to be supported and having a supporting end adapted to contact a supporting plane so as to support the object in restrained condition, and a supporter for transport mounted on the object to be supported so as to be movable between a retracted position in which the supporting end thereof at least contacts the supporting plane simultaneously with the supporting end of the supporter for restraint and a projecting position in which the supporting end of the supporter for transport projects toward the supporting plane farther than the supporting end of the supporter for restraint. An urging mechanism urges the supporter for transport at or adjacent the projecting position toward the supporting plane with a force greater than the gravity acting on the object being supported and at or adjacent the retracted position with a force smaller than the gravity acting thereon.

In this arrangement, when the supporter for transport is operated to cause the supporting end thereof to move to the projecting position, which is nearer to the supporting plane than the supporting end of the supporter for restraint, the supporting end of the supporter for transport contacts the supporting plane while the supporting end of the supporter for restraint is off the supporting plane, so that the object to be supported is supported by the supporter for transport so as to be movable. In this position, the supporter for transport is urged by the urging mechanism toward the supporting plane with a force greater than the gravity acting on the object being supported, so that despite the counterforce corresponding to the gravity the supporter for transport receives from the supporting plane, the supporter for transport is prevented from being moved to the retracted position and kept stable in the movable condition.

Under the above condition, if an external force is artificially applied so as to make the gravity acting on the object being supported apparently greater than the force with which the supporter for transport is urged by the urging mechanism toward the supporting plane, the supporter for transport is moved toward the retracted position by the counterforce from the supporting plane corresponding to the gravity against the urging force of the urging mechanism. Having moved to the retracted position, the supporting end of the supporter for transport at least contacts the supporting plane simultaneously with the supporting end of the supporter for restraint, or is moved in the direction opposite to the supporting plane beyond the supporting end of the supporter for restraint, so that the support of the object being supported is provided predominantly by the supporter for restraint, which supports the object in restrained condition. Although the supporter for transport in this condition is still urged by the urging mechanism toward the supporting plane, unlike in the previous case the urging force acting on the supporter for transport at this portion becomes smaller than the gravity acting on the object being supported, so that despite the supporter for transport having been caused by the urging mechanism to contact the supporting plane, the counterforce from the supporting plane corresponding to the gravity will not be overcome to cause the supporter for transport to move to the projecting position, so that the restrained condition is kept stable.

Under the condition, if an external force is artificially applied so as to make the counterforce from the supporting plane corresponding to the gravity acting on the object being supported apparently smaller than the force with which the supporter for transport is urged by the urging mechanism toward the supporting plane, projection of the supporter for transport is casued to occur by the urging force of the urging mechanism. When the supporting end of the supporter for transport has moved to the projecting position, the urging force of the urging mechanism again exceeds the gravity on the object being supported thereby to keep the movable condition thereof stable.

Thus, according to the invention, by mere application of an artificial external force to the object being supported itself it is very easily possible to change the object from the movable to the restrained condition or from the restrained to the movable condition.

The device of the invention having the above construction has advantages and effects as follows.

The object supporting device of the invention is so arranged that while the supporter for transport is in the projecting position where it functions effectively, the urging mechanism urges the supporter against the gravity acting on the object being supported thereby to keep the supporter in that position, and that when the supporter for transport has been moved by application of a load exceeding it to the retracted position where the supporter for restraint functions effectively, the urging force of the urging mechanism is reduced to prevent the supporter for transport from moving to the projecting position by itself.

Thus, in order to change the object being supported between the restrained and the movable condition no troublesome handling of a lever is needed, with resulting marked improvement in the operability of the device as compared with the conventional devices. Moreover, since the object supporting device of the invention is constructed as an independent unit, the structure thereof is much more simplified than the conventional devices such as the one which is to be operated in ganged relation to a table top movable like a flap. The device of the invention has other advantages such that when many tables are to be arranged with their table tops in edge-to-edge contact with one another, the tables can be brought to their respective positions with their table tops held in a position for use, and then locked there by imposing thereon a load such as the body weight of the operator, and that when the table is to be stored, the device of the invention can be locked with the table top being held upright in a position for nonuse, so that the table can be stored in good condition. As compared with the conventional devices, the device of the invention markedly improves the convenience in operating or handling an object such as a foldable table.

BEST MODES OF EMBODYING THE INVENTION

Various embodiments of the invention will be described with reference to the drawings.

First Embodiment

Figure 1:
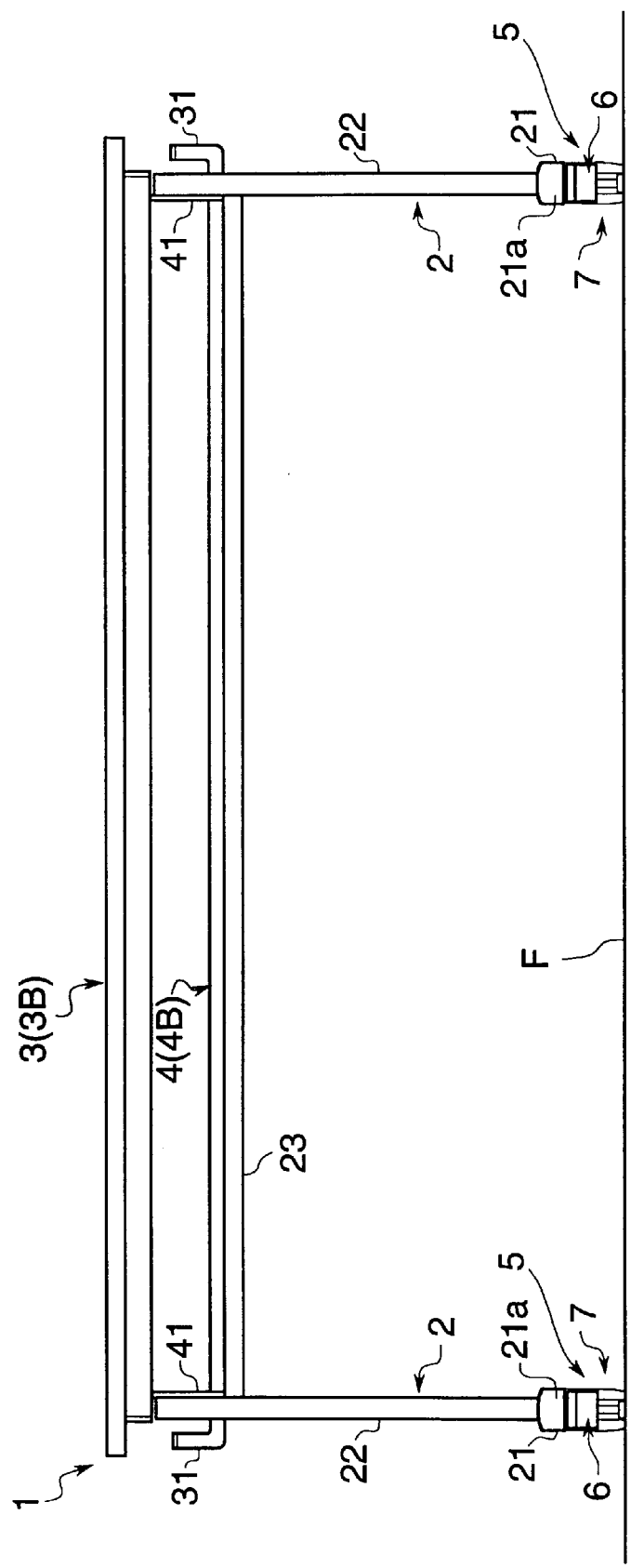
FIG. 1 is a front view of a foldable table to which a first embodiment of the present invention is applied.
Figure 2:
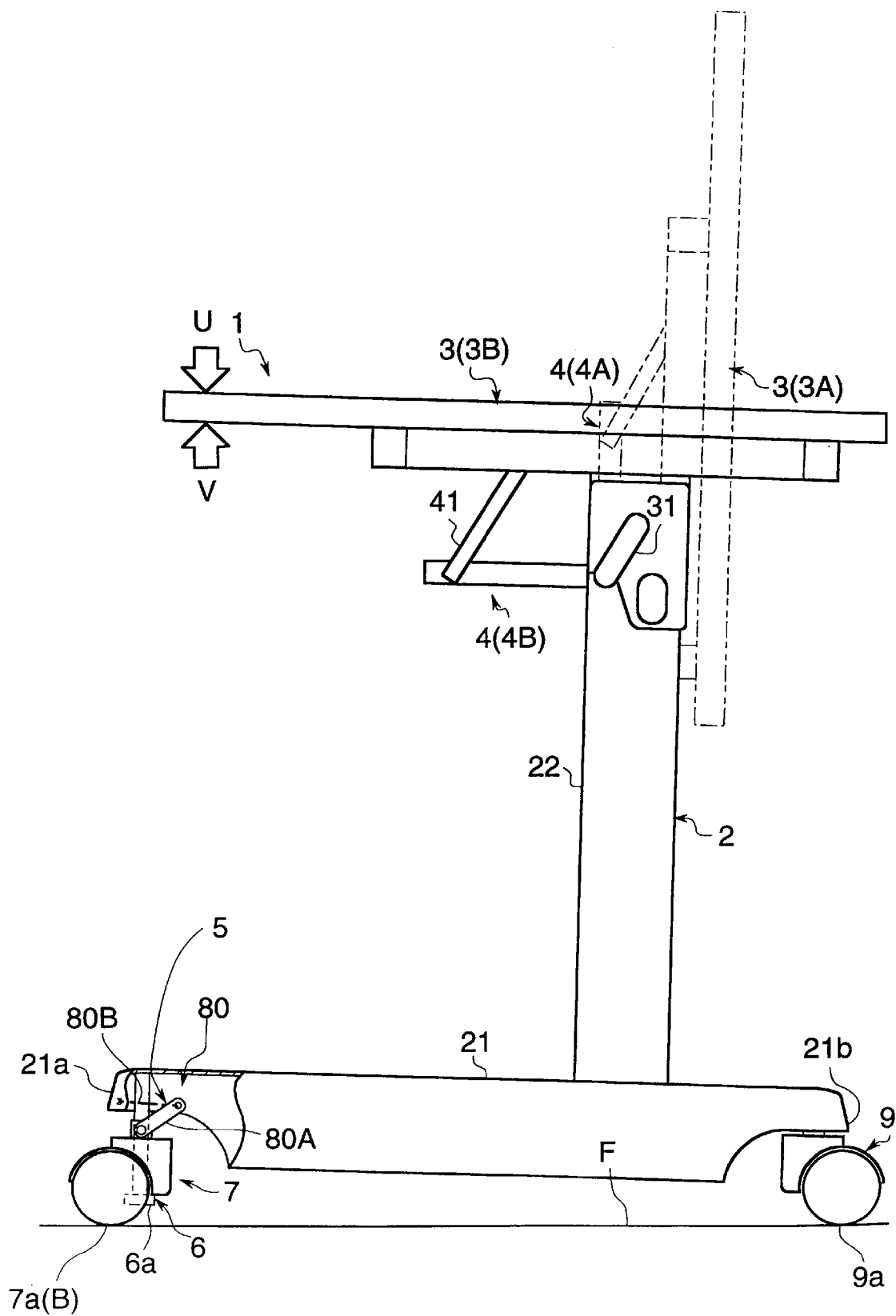
FIG. 2 is a side view of the table in the movable condition.
Figure 3:
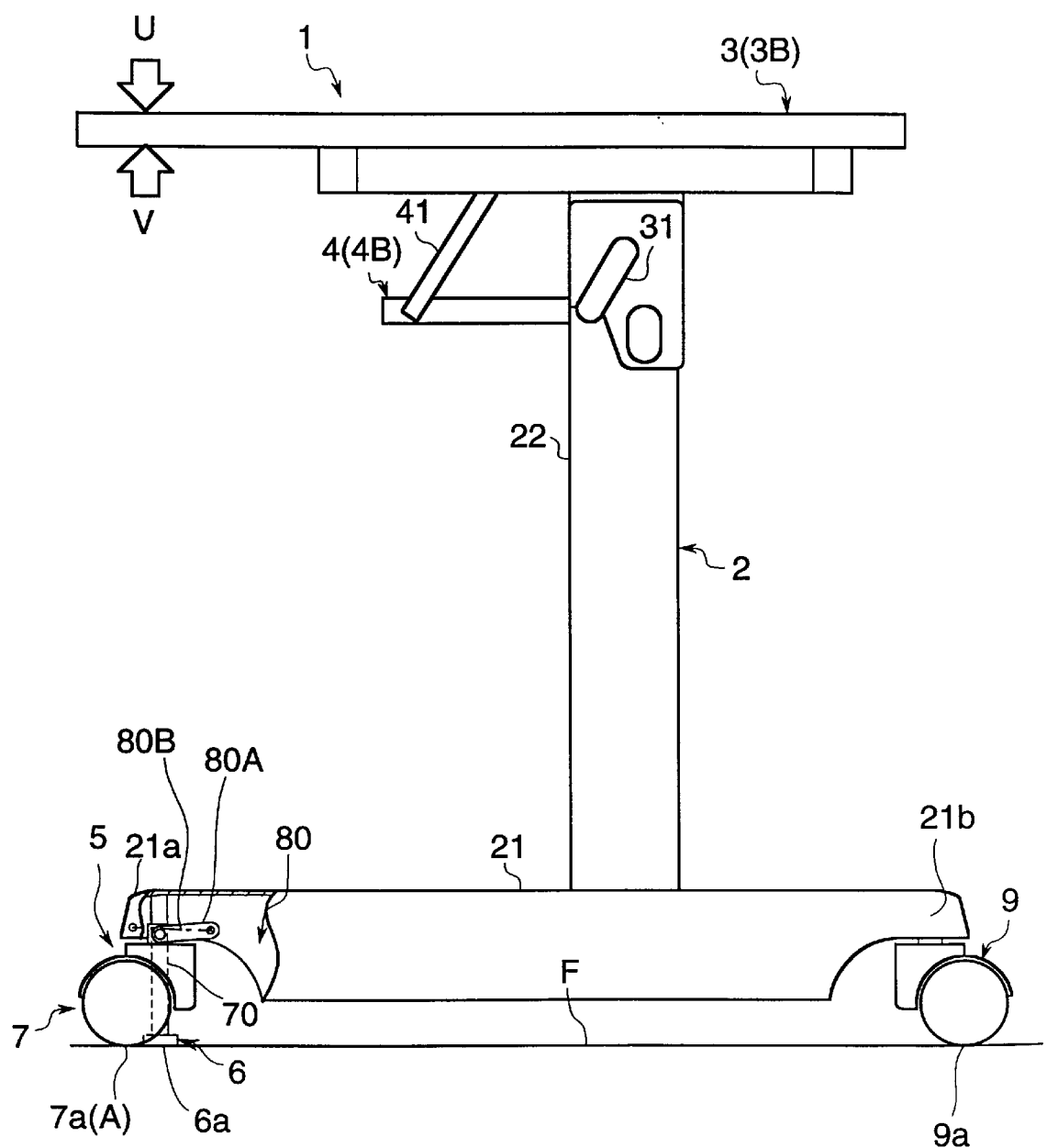
FIG. 3 is a side view of the table in the restrained condition.
Figure 4:
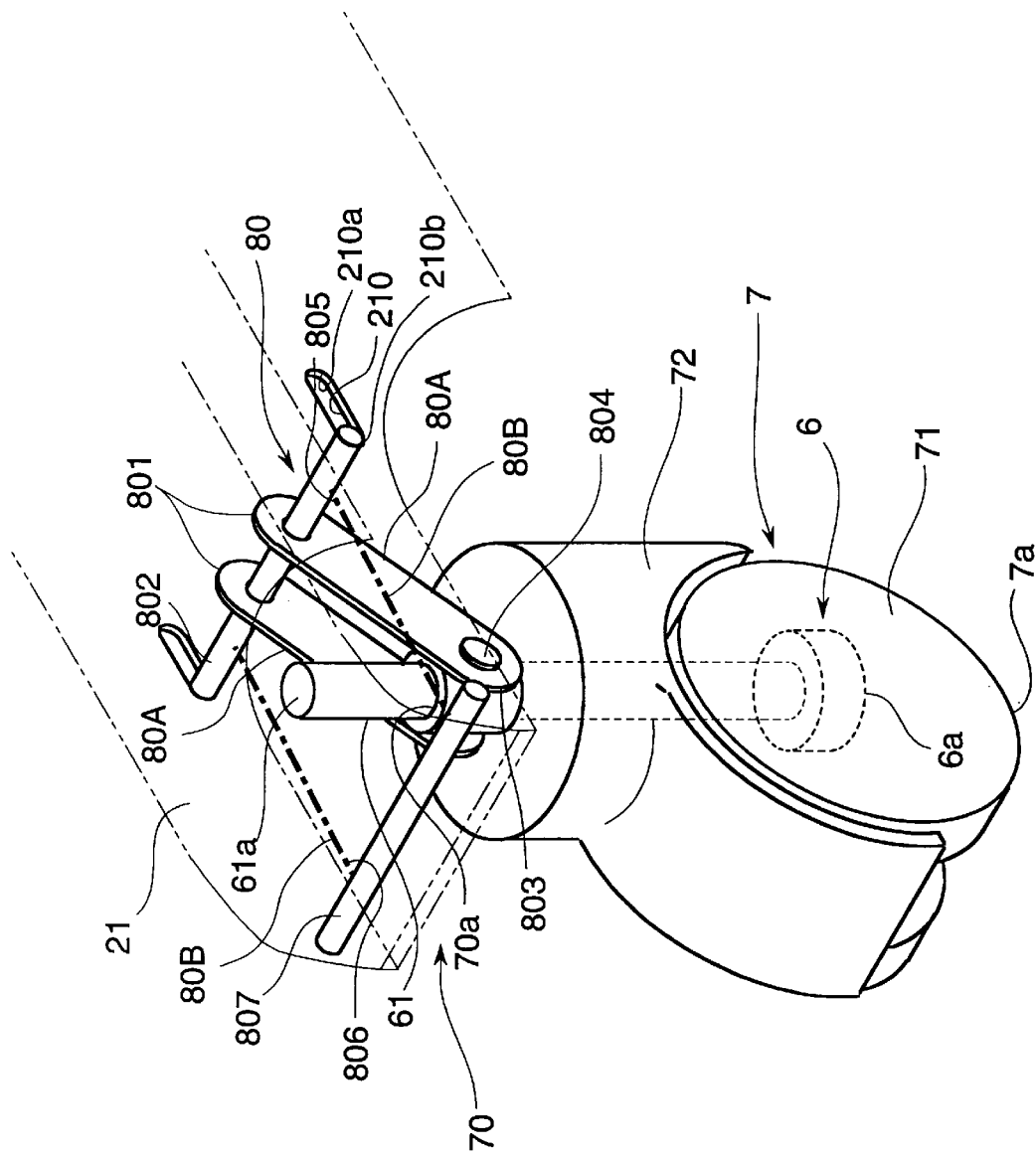
FIG. 4 is a perspective view, partly eliminated, of the table supporting device of the embodiment.
Figure 5:
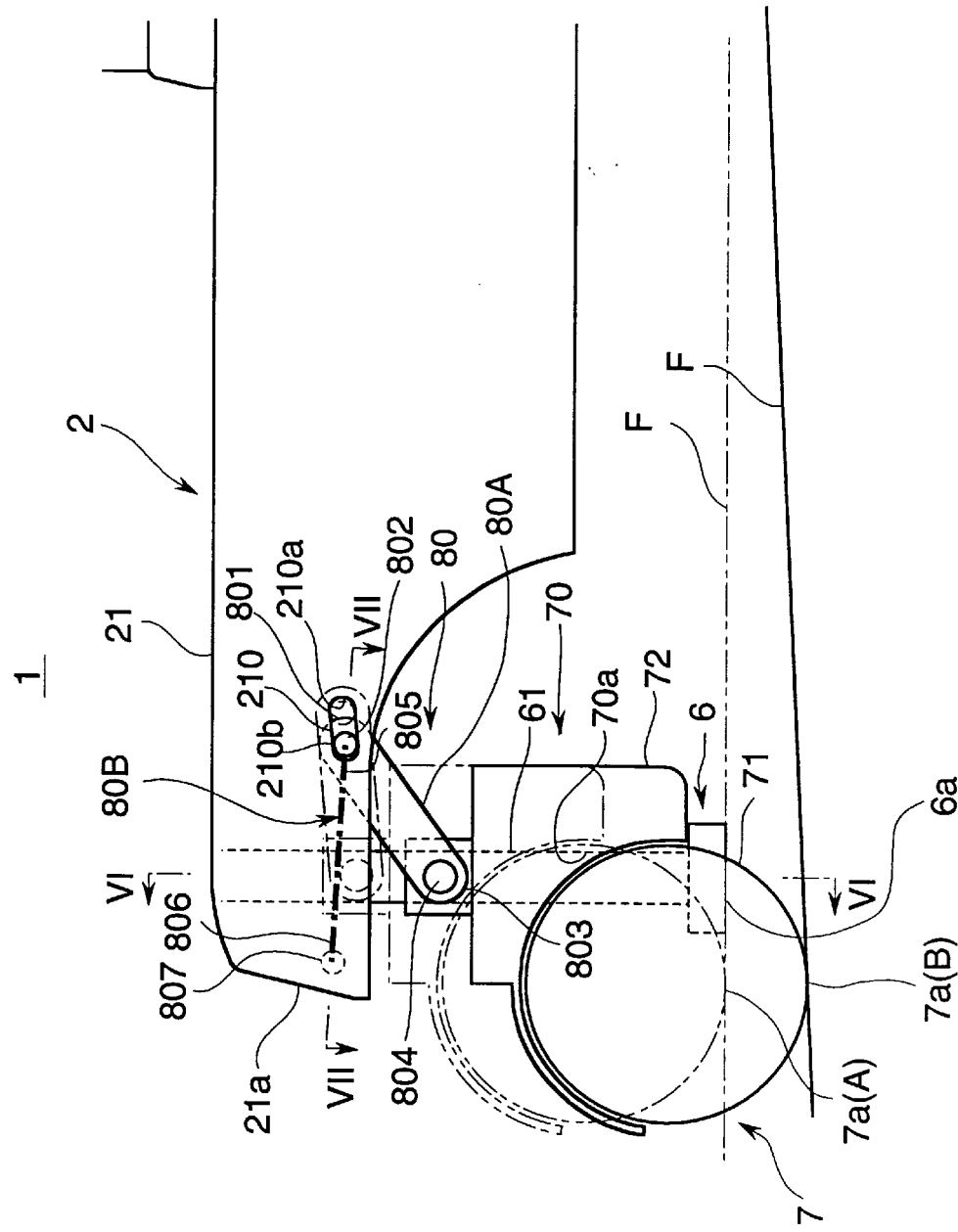
FIG. 5 is a side view of the device.
Figure 6:
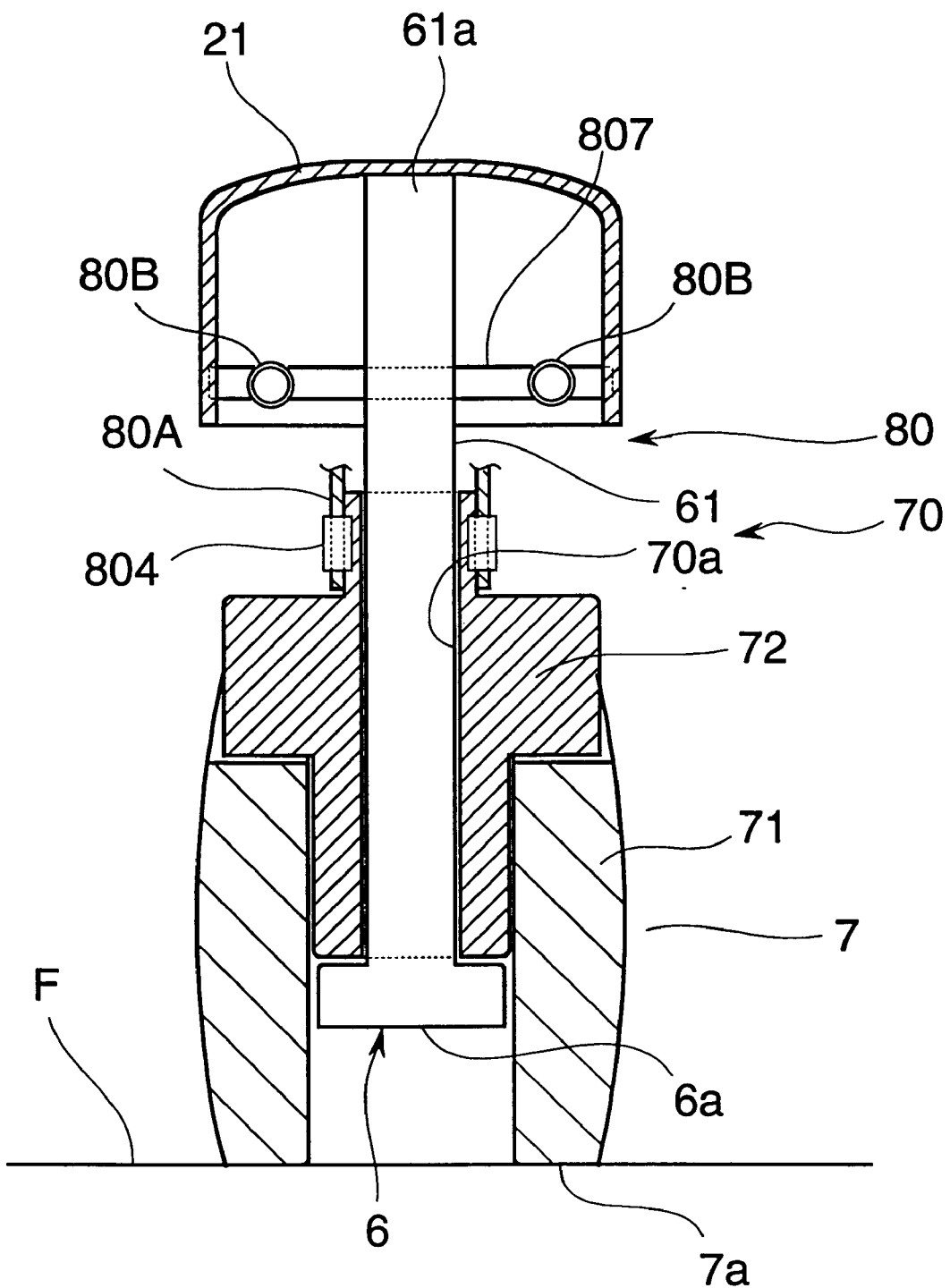
FIG. 6 is a sectional view taken along the line VI—VI in FIG. 5.
Figure 7:
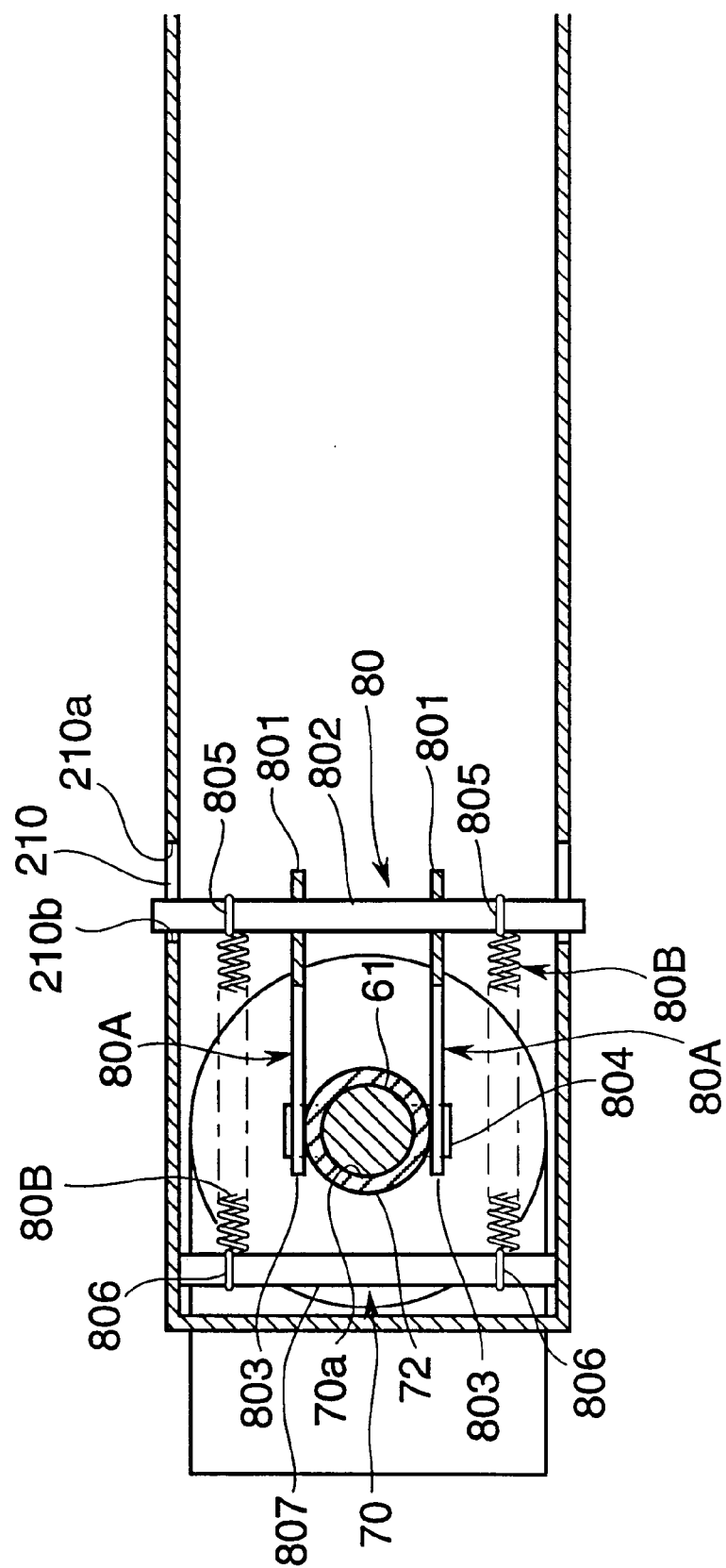
FIG. 7 is a sectional view taken along the line VII—VII in FIG. 5.
Figure 8:
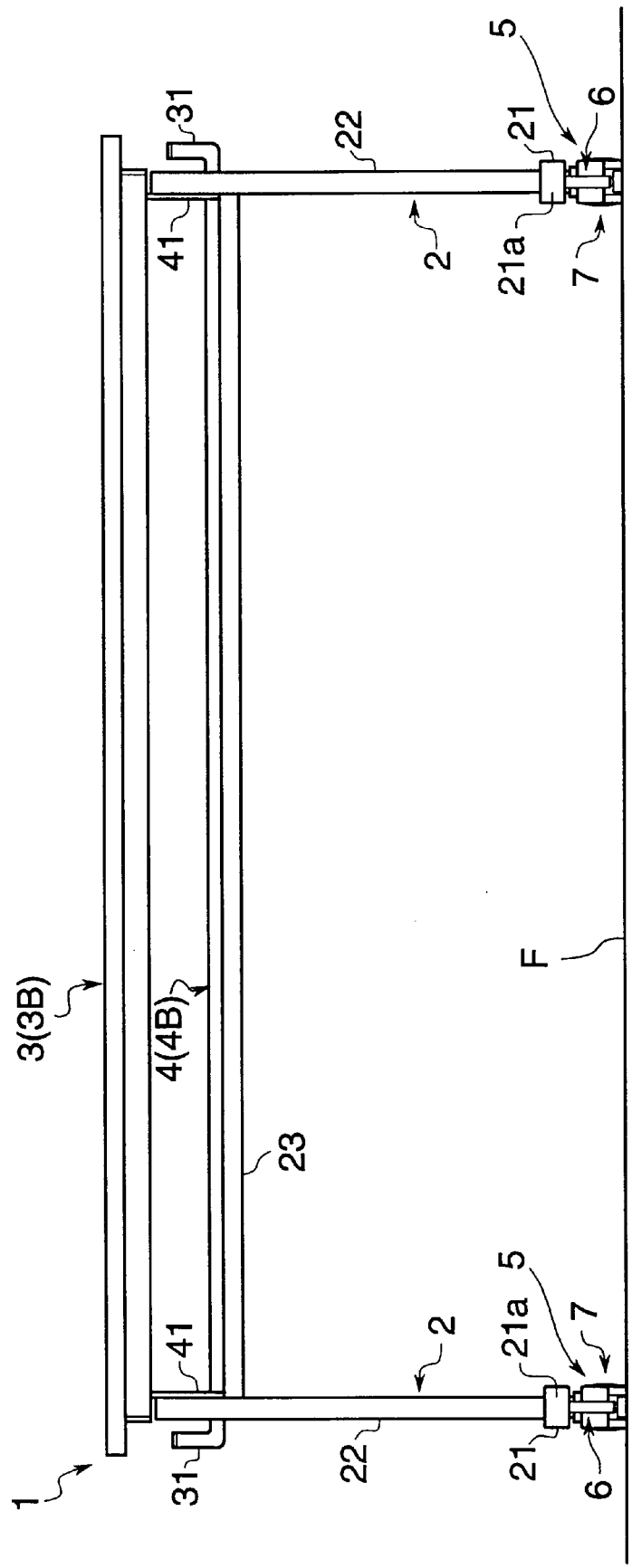
FIG. 8 is a front view of a foldable table to which a second embodiment of present invention is applied.

This embodiment is applied to a table supporting device 5 adapted to support a foldable table 1, which is an object to be supported, on a floor F, which is a supporting plane, as shown in FIGS. 1 through 3.

The foldable table 1 comprises a right and a left main leg 2, a table top 3 and a shelf 4, the legs 2 supporting the table top 3 adjacent their top ends in such a manner that the table top 3 can be moved like a flap.

Each of the right and left main legs 2 comprises a base 21 supported by the table supporting device 5 generally horizontally on the floor F and a vertical rod 22 standing upright at about the center of the base 21, with a connecting beam 23 bridging the right and left rods 22 for rigid connection thereof.

The table top 3 comprises a generally rectangular plate and a frame secured to the under surface of the plate, and is supported by the vertical rods 22 adjacent their top ends in such a manner that the plate is moved like a flap between an upright position 3A for nonuse as shown by imaginary lines in FIG. 2 and a horizontal position 3B for use as shown by real lines in the same figure. The table top 3 is locked in both the positions 3A and 3B for use and nonuse by a known locking mechanism not shown, and the lock is released by turning a lock release lever 31 provided on a lateral side of each upright rod 22.

The shelf 4 is supported by the right and left upright rods 22 immediately above the horizontal beam 23 in such a manner that the shelf 4 can be moved like a flap between the upright position 4A for nonuse as shown by imaginary line in FIG. 2 and the horizontal position 4B for use as shown by real line in the same figure. The shelf 4 and the table top 3 are connected by a linkage 41 so that they can be flapped in parallel.

As shown in FIGS. 2 through 7, the table supporting device 5 embodying the invention is provided adjacent the front end 21a of the base 21, and comprises an adjuster 6 which is a supporter for restraint, a caster 7 which is a supporter for transport, and an urging mechanism 80 for urging the caster 7, so that the device 5 may support the foldable table 1 in a movable position as shown in FIG. 2 and alternatively in a restrained position as shown in FIG. 3.

The adjuster 6 is provided on the forward end portion 21a of the base 21 and comprises a stem 61 having its upper end 61a fixed to the under surface of the top wall of the base 21 and being provided at its lower end with a supporting member 6a adjustable in height by suitable means, not shown, so as to be placed on a floor F thereby to support the foldable table 1 in the restrained condition.

The caster 7 comprises a pair of rollers 71 and a holder 72 for supporting the rollers so as to be rotatable about an axis. In the holder 72 there is formed a vertically piercing bore 70a, through which the stem 61 of the adjuster 6 is inserted, so that the stem 6 and the bore 70a form a guide for guiding the caster 7 in such a manner that the caster 7 is moved selectively to and away from the floor F. In particular, the caster 7 is movable along the stem 61 of the adjuster 6 between a retracted position A (see FIGS. 3 and 5) in which the supporting end 7a at least contacts the floor F simultaneously with the supporting end 6a of the adjuster 6 and a projecting position B (see FIGS. 2 and 5) in which the supporting end 7a projects toward the floor F downwardly of the supporting end 6a of the adjuster 6.

The urging mechanism 80 comprises a pair of links 80A connecting the caster 7 and the base 21 and resilient means in the form of a pair of tension coil springs 80B for urging the links 80a.

The pair of links 80A are connected at one end 801 to a transverse pin 802 and at the opposite end 803 to a pivot pin 804. The opposite ends of the transverse pin 802 slidably engage in a pair of slots 805 formed in the opposing lateral walls of the base 21 so as to extend longitudinally thereof, and the pivot pin 804 is mounted on the upper portion of the roller holder 72 of the caster 7. The relative positions of the pins 802 and 804 and the distance therebetween are such that when the pin 802 is positioned at one end 210a of each slot 210, the supporting end 7a of the caster 7 is held in the retracted position A where the supporting end 7a at least contacts the floor F simultaneously with the supporting end 6a of the adjuster 6, and that when the pin 802 is positioned at the opposite ends of the slots 210, the supporting end 7a of the caster 7 is held in the projecting position B where the supporting end 7a of the adjuster 7 projects toward the floor F downwardly of the supporting end 6a of the adjuster 6.

The springs 80B are fixed at one end 805 to the pin 802 and at the oppposite end 806 to a spring retainer 807 bridging the opposite lateral walls of the base 21 at a position forward of the above-mentioned transverse pin 802, so that the springs resiliently urge the pin 802 from the ends 210a of the slots 210 toward the opposite ends 210b thereof. The urging force is converted through the pin 802, the slots 210, the link members 80A and the guide 70 to an urging force to cause the caster 7 to project toward the projecting position B. The urging force increases as the angle which the line connecting the pins 802 and 804 makes with the axial lines of the springs 80B increases, that is, as the pin 802 approaches the other ends 210b of the slots 210. The force of the springs 80B is so selected that when the supporting end 7a of the caster 7 is at or adjacent the projecting position B, a force greater than the gravity acting on the table 1 urges the caster 7 toward the floor F, and that when the supporting end 7a of the caster 7 is at or adjacent the retracted position A, a force smaller than the gravity acting on the table 1 urges the caster 7 toward the floor F.

On the rear end 21b of the base 21 there is provided a caster 9 of a conventional structure such that when the supporting end 9a thereof contacts the floor F simultaneously with the supporting end 6a of the adjuster 6, the base 21 is held in horizontal position.

The operation of the embodiment will now be described. While the supporting end 7a of the caster 7 is in the projecting position B shown in FIG. 5, in which the supporting end 7a projects toward the floor F downwardly of the supporting end 6a of the adjuster 6, the supporting end 7a of the caster 7 contacts the floor F, with the supporting end 6a of the adjuster being off the floor F, so that the casters 7 and 9 support the table 1 so as to be movable in a rearwardly slightly tilted position as shown in FIG.2. In this position, the caster 7 is urged by the urging mechanism 80 onto the floor F with a force greater than the gravity acting on the table 1, so that despite the counterforce corresponding to the gravity the caster 7 receives from the floor F, the supporting end 7a thereof is prevented from being retracted into the retracted position A thereby to keep the table stable in the movable condition.

When a load in the direction shown by an arrow U in the drawing is placed on the table 1 by pressing it downwardly by hand thereby to make the gravity on the table apparently greater than the force with which the caster 7 is urged by the urging mechanism 80 toward the floor F, the caster 7 receives a counterforce corresponding to the gravity so as to be moved to the retracted position A against the urging force of the urging mechanism 80. Having moved to the retracted position A as shown in FIG. 3, the supporting end 7a of the caster 7 at least contacts the floor F along with the supporting end 6a of the adjuster 6, so that the support of the table 1 is provided predominantly by the adjuster 6, which supports the table in the restrained condition. Although in this position the caster 7 is still urged by the urging mechanism 80 onto the floor F, unlike in the previous case the urging force is not effectively converted into a force to project the caster 7 and is smaller than the gravity acting on the table 1. As a result, despite the caster 7 having been caused by the urging mechanism 80 to contact the floor F, the counterforce from the floor F corresponding to the gravity is not overcome to cause the caster 7 to move to the projecting position B, so that the restrained condition is kept stable.

If the table 1 in this position is artificially moved in the direction shown by an arrow V shown in the drawing by raising the table top 3 by hand thereby to make the counterforce from the floor F corresponding to the gravity acting on the table 1 apparently smaller than the force with which the caster 7 is urged by the urging mechanism 80 toward the floor F, projecting movement of the caster 7 is caused by the urging force of the urging mechanism 80. When the supporting end 7a of the caster 7 has moved to the projecting position B as shown in FIG. 2, the urging force of the urging mechanism 80 again exceeds the gravity on the table 1 thereby to keep the movable condition of the table 1 stable.

As described above, in the table supporting device 5 of the embodiment of the invention, it is possible to cause the table 1 to change from the movable condition to the restrained condition by a mere action of a person leaning against the table top 3 or base 21 of the table 1, and from the restrained condition to the movable condition by a mere action of lifting a little the top 3 of table 1. This is possible without operating a lever at all, and the change in the condition of the table can be effected by an operation following the flapping action of the table top 3, so that the convenience of handling the device of the invention is improved greatly as compared with the conventional locking devices. In addition, the table supporting device 5 is structurally quite independent of the mechanism for flapping the table top 3, so that the construction becomes much simplified and the number of the manufacturing steps and the manufacturing cost are reduced as compared with the conventional devices in which the supporting device and the flapping mechanism are in ganged relation. Moreover, in the device of the invention, since the table 5 can be kept in the movable condition with the table top 3 being held in the position 3B for use, various advantages can be obtained such that when many tables are to be arranged with the side edges of their table tops held in contact with one another, it is possible to arrange the tables with their table tops 3 held in the position 3B for use, and that since the table supporting device can be locked with the table top 3 held upright in the position 3A for nonuse, it is possible to store many tables stably in a smaller area than otherwise.

Second Embodiment

In FIGS. 8 through 13, the caster 7 that is the supporter for transport is provided on the foldable table 1 by means of a swingable arm 73, which is urged by an urging mechanism 8 of a different structure from that of the previous embodiment, so that the caster 7 and the adjuster 6 support the table 1 in the movable condition and alternatively in the restrained condition. In the following description, the same reference symbols will be used to indicate the components corresponding to those of the previous embodiment and no description will be given to them.

The adjuster 6 is provided on the forward end 21a of the base 21 and has at the lower end thereof a supporting end 6a, the position of which is adjustable by means of a nut 62 provided on the middle portion of the adjuster, so that the end 6a contacts the floor F thereby to support the table 1 in the restrained condition.

The swingable arm 73 has its proximal end 73b pivoted to the base 21 adjacent the forward end portion 21a thereof by a horizontal pin 73a, and the roller holder 72 of the caster 7 is mounted on the distal end 73c of the swingable arm 73 by a stem 74 so that the holder 72 is horizontally rotatable about a vertical axis. As the swingable arm 73 pivots, the supporting end 7a can take a retracted position A (see FIGS. 10 and 12) in which the supporting end 7a at least contacts the floor F simultaneously with the supporting end 6a of the adjuster 6 and alternatively the projecting position B (see FIGS. 9 and 12) in which the supporting end 7a projects toward the floor F downwardly of the supporting end 6a of the adjuster 6. To urge the arm 73, a relatively week torsion coil spring 75 is provided on the horizontal pivot pin 73a, with one end thereof engaging the upper edge of the arm 73 and the other end thereof engaging the upper wall of the base 21 thereby to urge the arm 73 in such a direction as to make the caster 7 project. A stopper 21c is provided on the bottom wall of the base 21 to prevent the arm 73 from pivoting beyond a limit in the direction to make the caster project.

Figure 9:
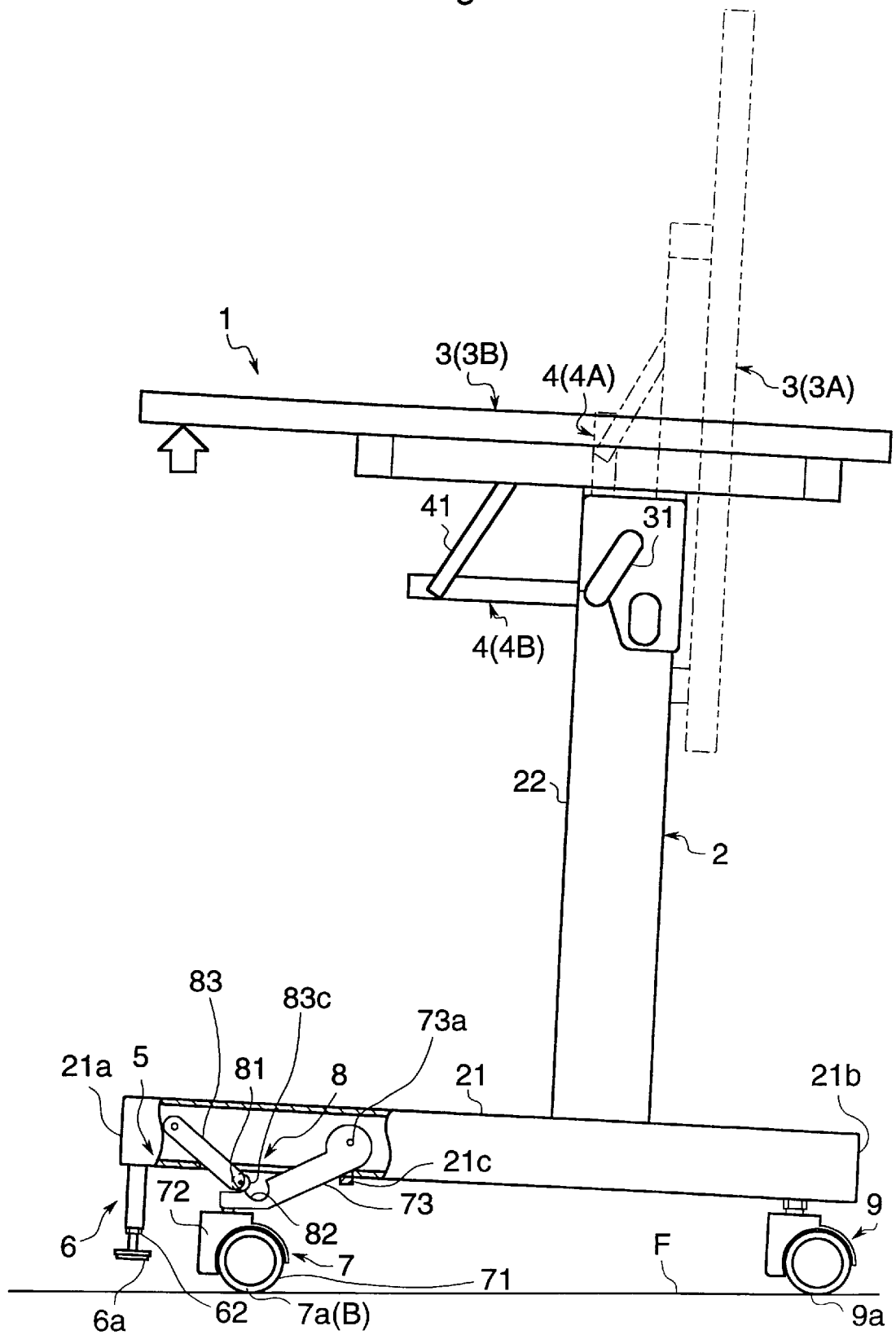
FIG. 9 is a side view of the table in the movable condition.
Figure 10:
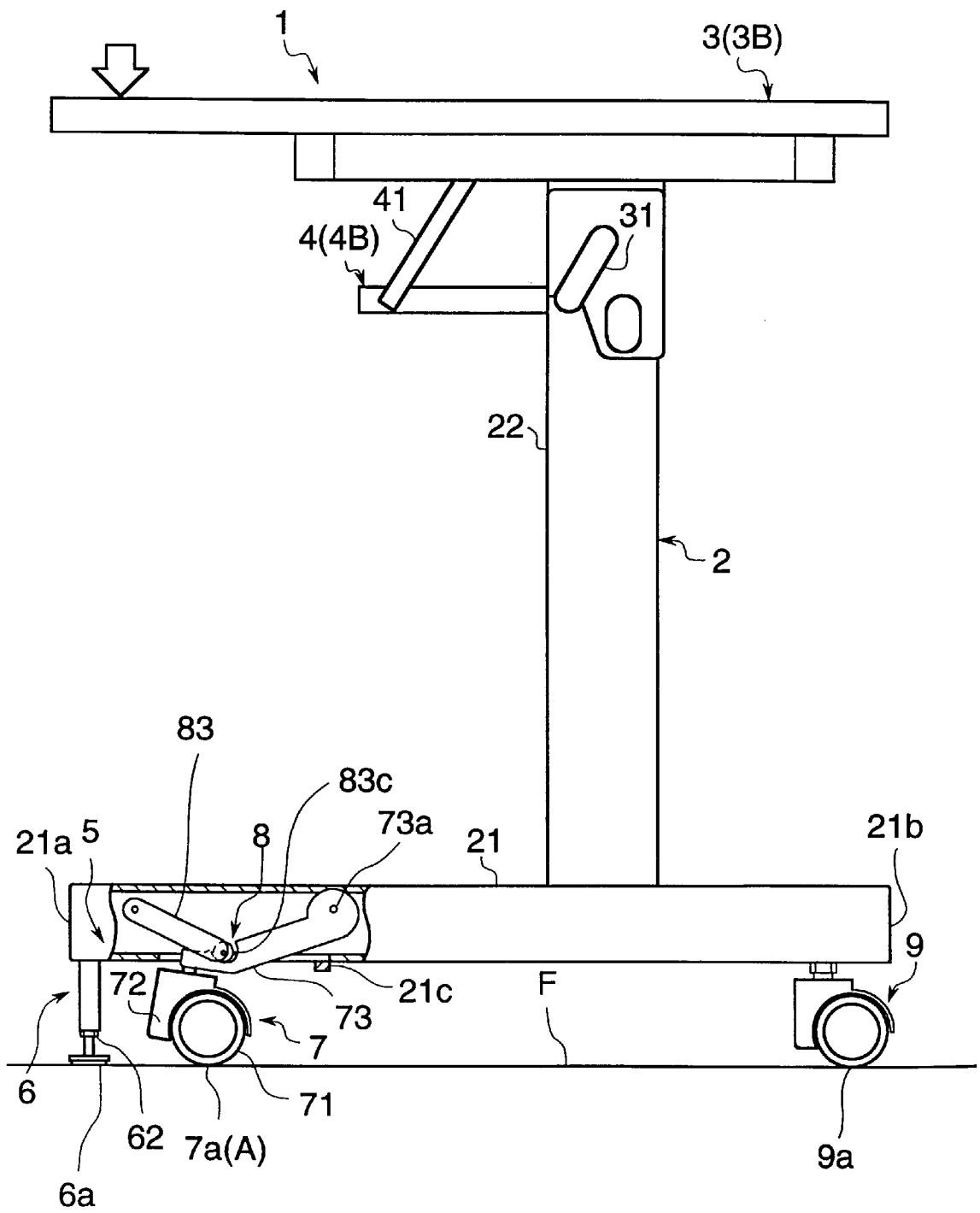
FIG. 10 is a side view of the table in the restrained condition.
Figure 11:
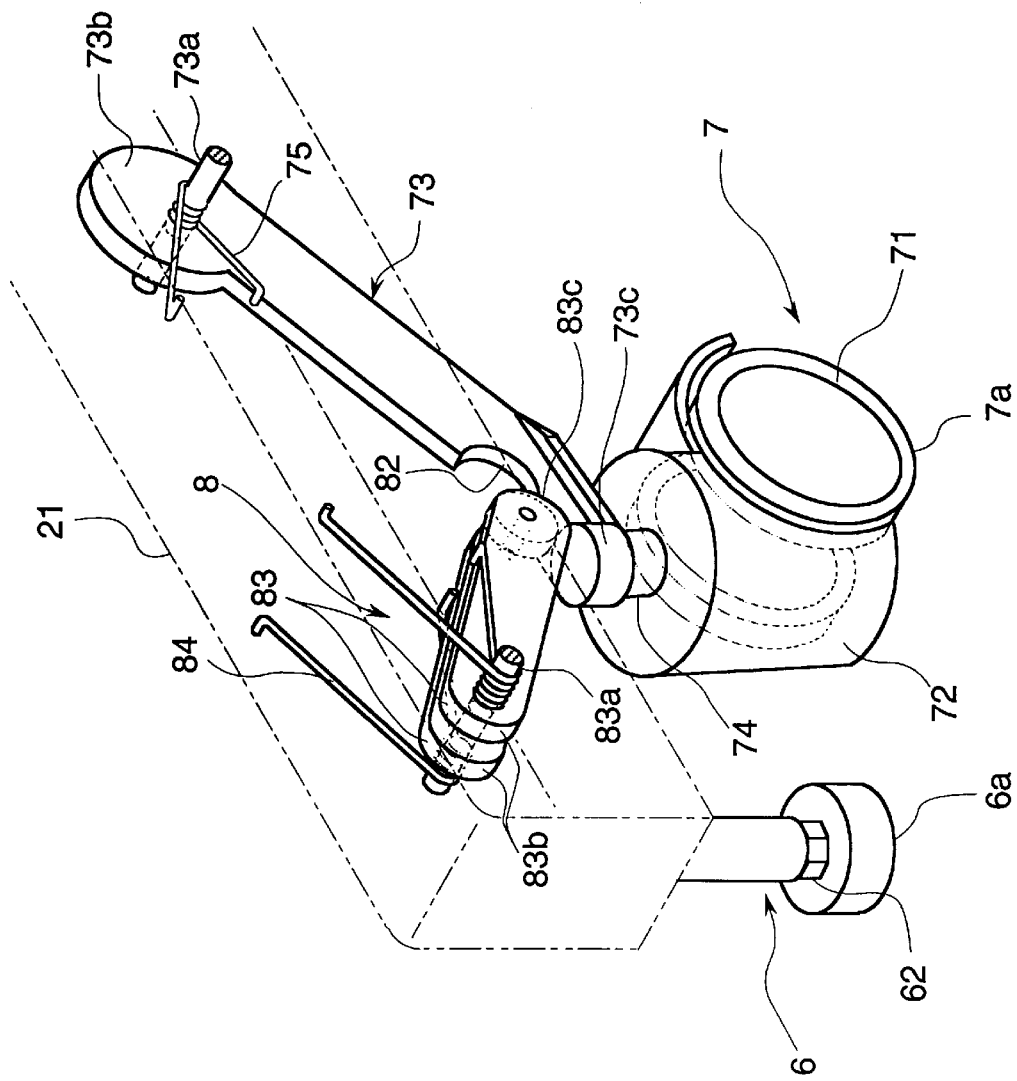
FIG. 11 is a perspective view, partly eliminated, of the table supporting device of the embodiment.
Figure 12:
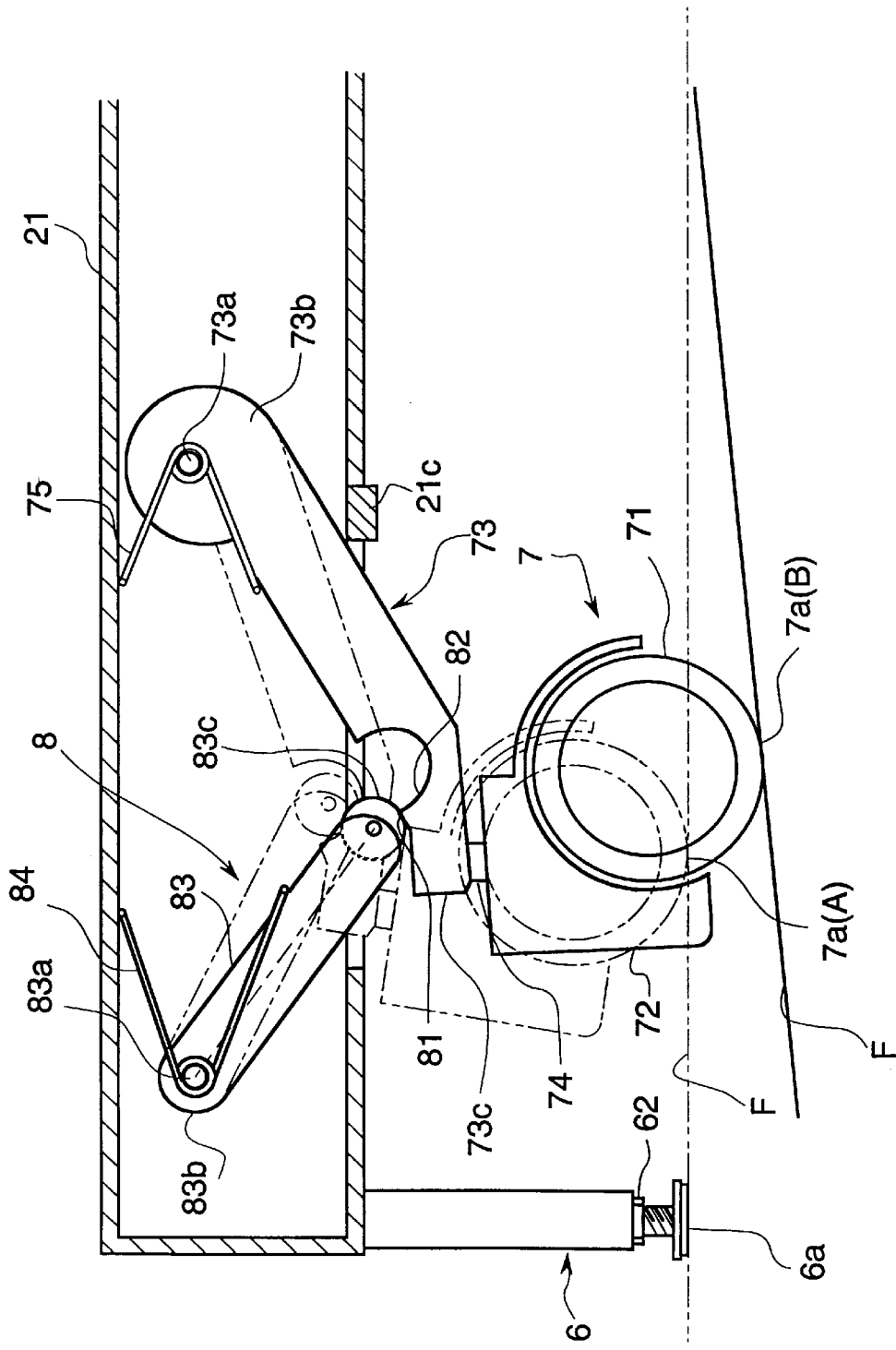
FIG. 12 is a side view, partly in section, of the device.
Figure 13:
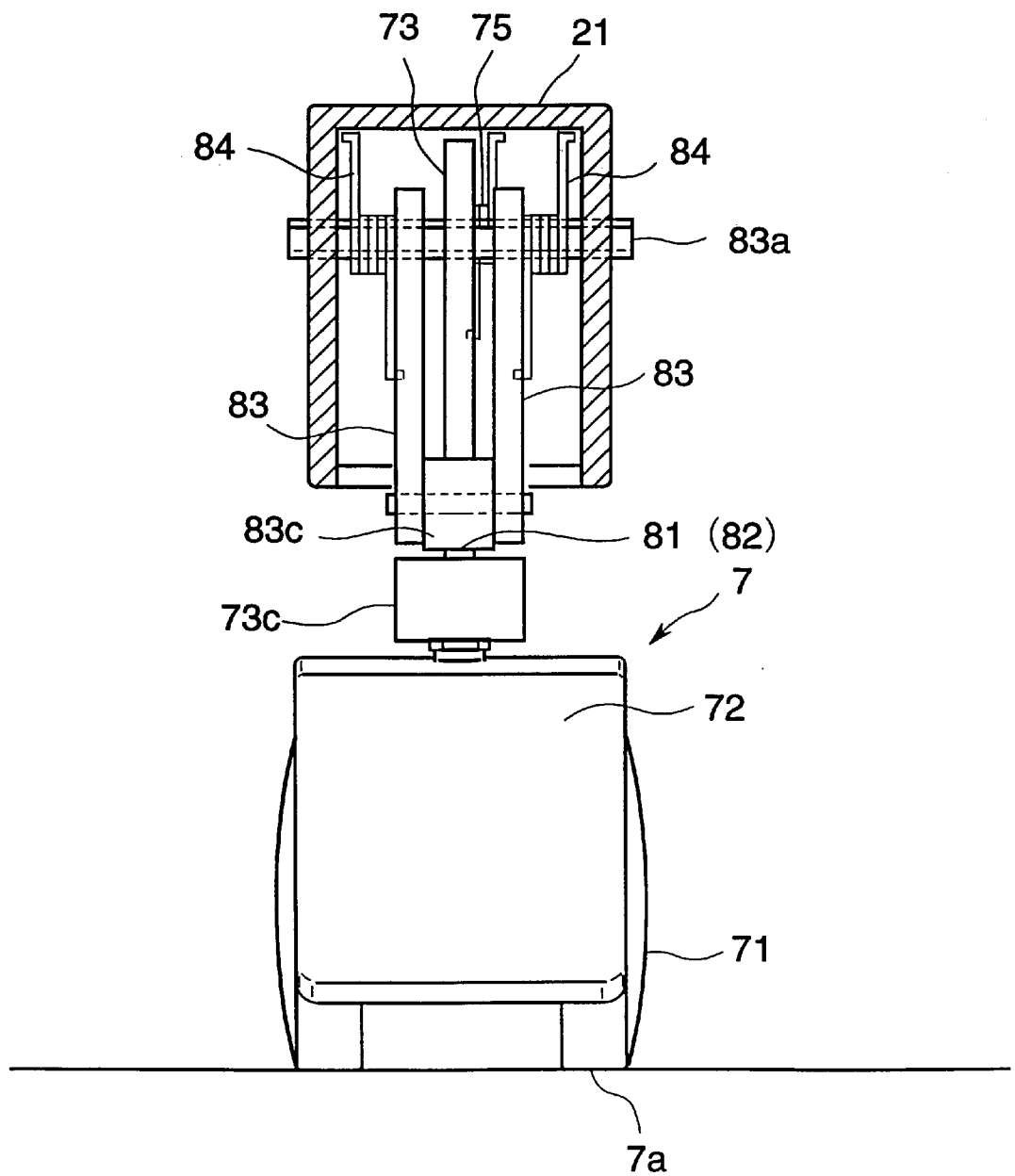
FIG. 13 is a front view, partly in section, of the device.

The urging mechanism 8 comprises a first and a second cam surfaces 81 and 82 formed on the upper edge of the arm 73, a pair of urging arms 83 disposed so as to engage the cam surfaces 81 and 82, and a pair of resilient members in the form of torsion coil springs 84 for urging the arms 83. The urging arms 83 have their proximal ends 83b pivoted to the base 21 by a horizontal pin 83a provided forwardly of the previously mentioned horizontal pivot pin 73a of the arm 73, with a cam follower roller 83c being provided between the lower ends of the arms 83 extending rearwardly downward at such a position that the cam follower roller 83c engages the cam surfaces 81 and 82 formed on the upper edge of the arm 73. In particular, the first cam surface 81 is formed by making a portion of the upper edge of the arm 73 slightly slanted so that when the supporting end 7a of the caster 7 is at or adjacent the projecting position B as shown in FIGS. 9 and 12, the cam follower 83c lies on the first cam surface 81, and the second cam surface 82 is formed by providing a generally U-shaped recess in the upper edge of the arm 73 so that when the supporting end 7a of the caster 7 is at or adjacent the retracted position A as shown in FIGS. 10 and 12, the cam follower 83c contacts the second cam surface 82. The first and second cam surfaces 81 and 82 are continuous.

In the above arrangement, when the caster 7 is moved toward the projecting position B, the angle which the linear line connecting the horizontal pivot pin 83c and the point at which the cam follower 83c contacts the first cam surface 81 makes with the first cam surface 81 approaches a right angle while the spring 84 exerts a spring force on the arms 83 to cause them to function like a toggle joint, so that the caster 7 is urged in the projecting direction by a force greater than the gravity acting on the foldable table 1. When the caster 7 is moved from the projecting position B toward the retracted position A, the cam follower 83c moves from the first cam surface 81 to the second cam surface 82, whereupon the angles, which the above-mentioned connecting linear line makes with the cam surfaces 81 and 82 abruptly change, so that most of the spring force of the spring 84 is offset by the rigidity in the longitudinal direction of the arm 73, thereby to make the urging force acting through the arm 73 on the caster 7 in the projecting direction smaller than the gravity acting on the foldable table 1.

On the rear end 21b of the base 21 there is provided a caster 9 of a conventional structure such that when the supporting end 9a thereof contacts the floor F simultaneously with the supporting end 6a of the adjuster 6, the base 21 is held in horizontal position.

The operation of the embodiment will now be described. While the supporting end 7a of the caster 7 is in the projecting position B shown in FIG. 12, in which the supporting end 7a projects toward the floor F downwardly of the supporting end 6a of the adjuster 6, the supporting end 7a of the caster 7 contacts the floor F, with the supporting end 6a of the adjuster being off the floor F, so that the casters 7 and 9 support the table 1 so as to be movable in a rearwardly slightly tilted condition as shown in FIG. 9. In this condition, the caster 7 is urged by the urging mechanism 8 onto the floor F with a force greater than the gravity acting on the table 1 so that despite the counterforce corresponding to the gravity the caster 7 receives from the floor F, the supporting end 7a thereof is prevented from being retracted into the retracted position A thereby to keep the movable condition stable.

When a load is artificially placed on the table 1 in that position by pressing the table top 3 downwardly by hand thereby to make the gravity on the table apparently greater than the force with which the caster 7 is urged by the urging mechanism 8 to the floor F, the caster 7 receives a counterforce corresponding to the gravity so as to be moved to the retracted position A shown in FIG. 10 against the urging force of the urging mechanism 8. Having moved to the retracted position A, the supporting end 7a of the caster 7 at least contacts the floor F simultaneously with the supporting end 6a of the adjuster 6, so that the support of the table 1 is provided predominantly by the adjuster 6, which supports the table in a restrained condition. Although the caster 7 in this position is still urged by the urging mechanism 8 onto the floor F, unlike in the previous case the urging force is smaller than the gravity acting on the table 1. As a result, despite the caster 7 having contacted the floor F, the counterforce from the floor F corresponding to the gravity is not overcome to cause the caster 7 to move to the projecting position B, so that the restrained condition is kept stable.

If the table 1 in this position is artificially moved by raising the table top 3 by hand thereby to make the counterforce from the floor F corresponding to the gravity acting on the table 1 apparently smaller than the force with which the caster 7 is urged by the urging mechanism 8 to the floor F, projecting movement of the caster 7 is caused by the urging force of the urging mechanism 8. When the supporting end 7a of the caster 7 has moved to the projecting position B, the urging force of the urging mechanism 8 again exceeds the gravity on the table 1 thereby to keep the movable condition of the table 1 stable.

As described above, in the table supporting device 5 of the embodiment of the invention, it is possible to cause the table 1 to change from the movable condition to the restrained condition by a mere action of a person leaning against the table top 3 or base 21 of the table 1, and from the restrained condition to the movable condition by a mere action of lifting a little the top 3 of table 1. This is possible without operating a lever at all, and the change in the condition of the table can be effected by an operation following the flapping action of the table top 3, so that the convenience of handling the device of the invention is improved greatly as compared with the conventional locking devices. In addition, the table supporting device 5 is structurally quite independent of the mechanism for flapping the table top 3, so that the construction becomes much simplified and the number of the manufacturing steps and the manufacturing cost are reduced as compared with the conventional devices in which the supporting device and the flapping mechanism are in ganged relation. Moreover, in the device of the invention, since the table 5 can be kept in the movable condition with the table top 3 being held in the position 3B for use, various advantages can be obtained such that when many tables are to be arranged with the side edges of their table tops held in contact with one another, it is possible to arrange the tables with their table tops 3 held in the position 3B for use, and that since the table supporting device can be locked with the table top 3 held upright in the position 3A for nonuse, it is possible to store many tables stably in a smaller area than otherwise.

Third Embodiment

Figure 14:
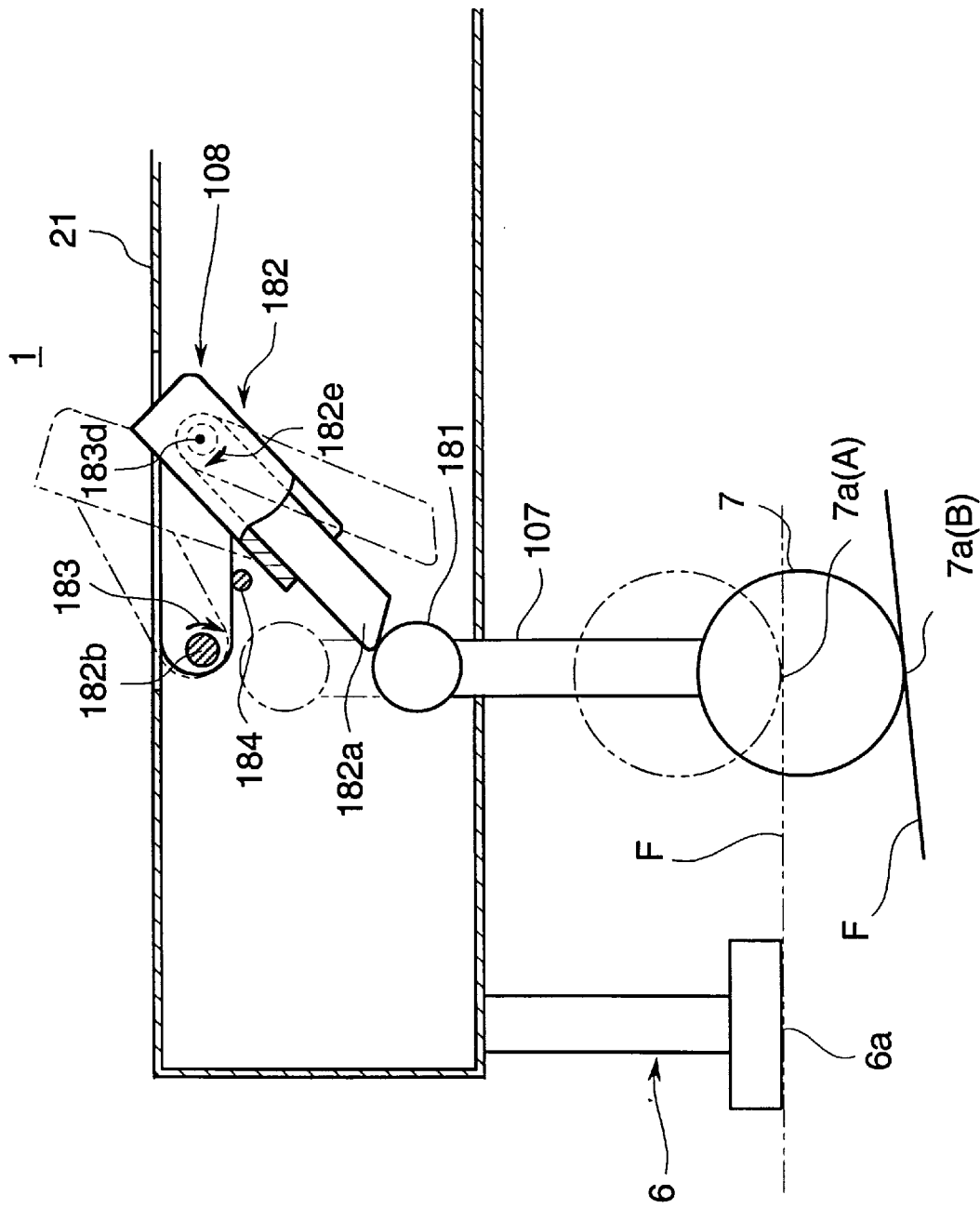
FIG. 14 is a side view, partly in section, of a third embodiment of the present invention.

In FIG. 14, the caster 7 that is the supporter for transport is mounted on the table 1 that is an object to be supported by means of a vertically movable rod 107 and an urging mechanism 108 different from that in the previous embodiments, so that the rod 107 and the caster 7 support the table 1 in a movable condition and alternatively in a restrained condition.

The vertically movable rod 107 is held in such a manner that it moves up and down relative to the base 21.

The urging mechanism 108 comprises a cylindrical cam 181 fixed to the top end of the rod 107 with the axis of the cam 181 being held horizontally, an urging member 182 pivoted by a pin 182b to the base 21 of the table 1 and having one end portion 182a disposed in the path along which the cam 181 is moved vertically, a resilient member in the form of a spring 183 urging the urging member 182 clockwise in the figure, and a stopper 184 for defining the range of rotation of the urging member 182.

In particular, the urging member 182 includes a case 182c in which the previously described one end portion 182a shaped like a knife is contained with its proximal end pivoted thereto by a pin 183d. The end portion 182a is normally resiliently urged by a spring 182e onto the upper inner surface of the case 182c when no external force is applied to the end portion 182a. In that position, the distal end of the end portion 182a lies in the previously described path of movement of the cam 181.

The cam 181 is disposed at such a position that when the supporting end 7a of the caster 7 is at or adjacent the projecting position B downwardly of the supporting end 6a of the caster 6, the cam 181 is urged toward the floor F by the end portion 182a of the urging member 182, and under the condition the force with which the spring 183 urges the caster 7 onto the floor F through the end portion 182a of the urging member 182 and the cam 181 is greater than the gravity acting on the table 1. When the supporting end 7a of the caster 7 is at or adjacent the retracted position A where the supporting end 7a of the adjuster 7 at least contacts the floor F simultaneously with the supporting end 6a of the adjuster 6, the cam 181 is held at a position where it is not urged by the end portion 182a of the urging member 182, and under the condition the force urging the caster 7 onto the floor F, that is, the gravity acting on the caster 7 and the vertically movable rod 107 or the sum of the gravity and an additional force provided by a spring not shown is smaller than the gravity acting on the table 1. When the supporting end 7a of caster 7 is moved from the retracted position A to the projecting position B by its own weight, etc. without being influenced by the gravity acting on the table 1, the end portion 182a of the urging member 182 temporarily interferes with the cam 181. However, the spring 182e which is relatively weak permits the end portion 182a to be pushed away to permit the cam 181 to pass by.

In the above arrangement, while the supporting end 7a of the caster 7 is at the projecting position B, the urging member 182 overcomes the counterforce from the floor F thereby to maintain the foldable table 1 stably in the movable condition. When an artificial load in the direction to increase the previously described counterforce is placed on the table 1 in the above condition, the cam 181 is raised, causing the whole urging member 182 to rotate counterclockwise about the pin 182b against the force of the spring 183 thereby to allow the supporting end 7a of the caster 7 to be moved to the retracted position B. After the cam 181 has passed the end portion 182a of the urging member 182, the whole urging member 182 is urged by the spring 183 to return to the position where it again abuts on the stopper 184. At this position, no such strong external force as to overcome the counterforce from the floor F acts on the caster 7, so that projection of the caster 7 will not be caused to occur and the table is kept stable in the restrained condition. When the table 1 in this condition is raised so as to reduce the counterforce from the floor F, the caster 7 is moved by its own weight so as to push the end portion 182a away thereby to move the supporting end 7a again to the projecting position B.

Thus, with the above arrangement just as in the previous embodiment, it is possible to place the table selectively under the movable and restrained conditions without operating a lever at all and with a simple structure, so that the operability and easiness in handling the device have been greatly improved.

Fourth Embodiment

Figure 15:
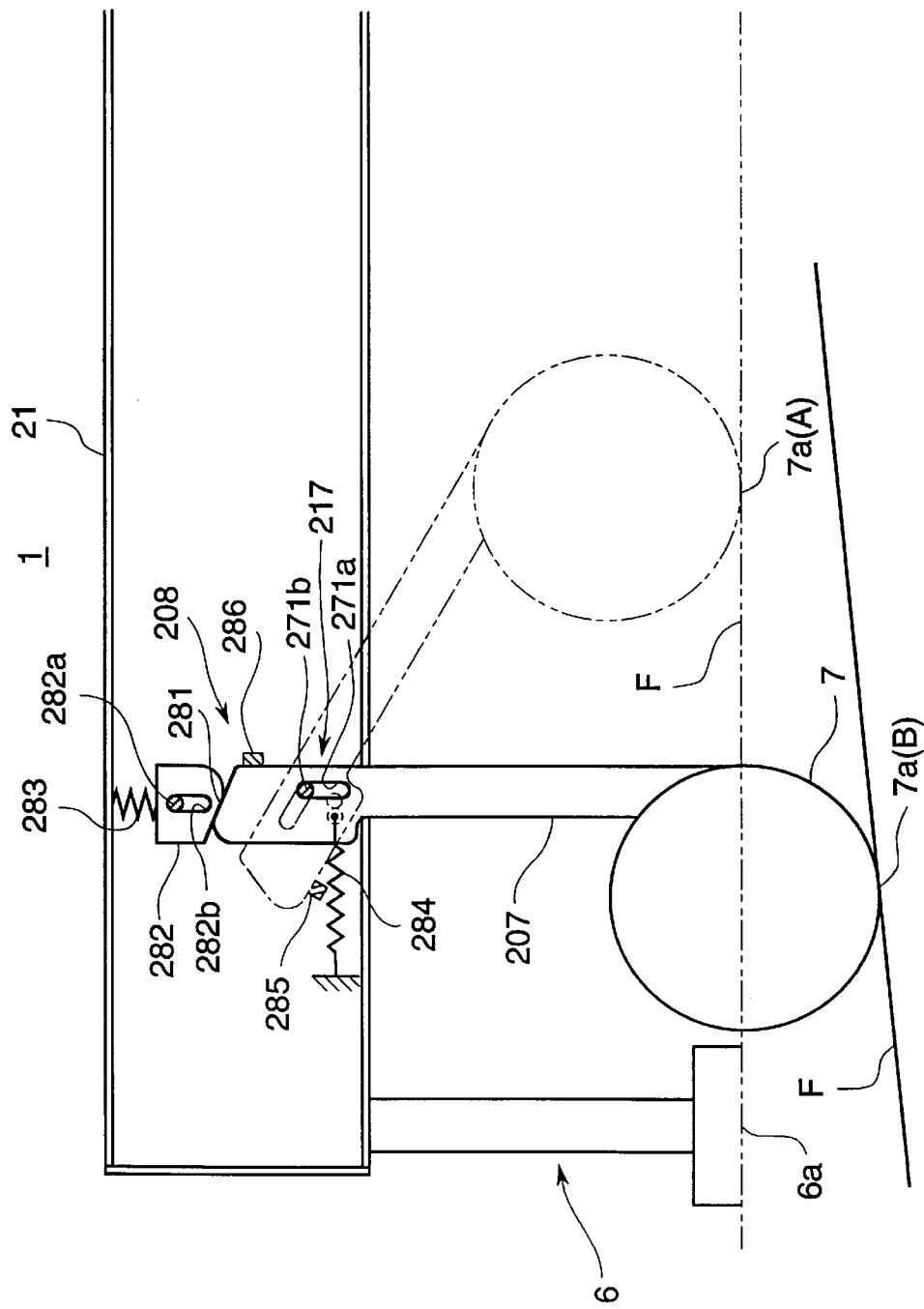
FIG. 15 is a side view, partly in section, of a fourth embodiment of present invention.

In FIG. 15, the caster 7 that is the supporter for transport is mounted on the foldable table 1 by means of a swingable frame 207, and in order to support the table 1 through the frame 207 and the caster 7 selectively in a movable and a restrained condition, an urging mechanism 208 different from the urging mechanism in the previous embodiments is provided.

The swingable frame 207 is provided adjacent the upper end thereof with a slot 271a, which is engaged by a horizontal pin 271b fixed to the base 21 of the table 1 thereby to form a pivoting mechanism 271, through which the frame 207 is mounted onto the base 21 so as to be swingable between the upright and inclined positions.

The urging mechanism 208 comprises a receiving surface 281 formed on top of the swingable frame 207, an urging slider 282b formed with a slot 282b which a pin 282a engages so that the slider 282 is disposed slidably at such a position as to abut on the receiving surface 281 when the caster 7 is at or adjacent the projecting position B, a resilient member in the form of a spring 283 for urging the slider 282, and a spring 284 for applying to the swingable frame 207 a force acting in a direction opposite to that in which the swingable frame 207 is inclined.

When the supporting end 7a of the caster 7 is at or adjacent the projecting position B where the supporting end 7a projects toward the floor F downwardly of the supporting end 6a of the adjuster 6, the force with which the urging slider 282 urges the caster 7 toward the floor F through the receiving surface 281 of the swingable frame 207 is greater than the gravity acting on the table 1. When the supporting end 7a of the adjuster 7 is at or adjacent the retracted position A where the supporting end 7a at least contacts the floor F simultaneously with the supporting end 6a of the adjuster 6, the swingable frame 207 is inclined so as to move the receiving surface 281 to a position where it is no longer pushed by the urging slider 282, and the force provided by the weight of the caster 7 and the spring 284 to urge the caster 7 toward the floor F is smaller than the gravity acting on the table 1.

When the caster 7 is moved from the retracted position B to the projecting position A without being influenced by the gravity acting on the table 1, the force of the spring 284 effectively acts to move the swingable frame 207 to the upright position where the receiving surface 281 of the swingable frame 207 can be urged by the urging slider 282. The receiving surface 281 of the swingable frame 207 is a little slanted so that when an external force to increase the counterforce from the floor F acts on the frame 207, the frame 207 is inclined about the pin 271b as a pivot. Stoppers 285 and 286 are provided to define the range in which the frame 207 swings.

In this arrangement, while the supporting end 7a of the caster 7 is at the projecting position B, the urging slider 282 overcomes the counterforce from the floor F thereby to keep the foldable table 1 stable in the movable condition. When an artificial load in the direction to increase the previously mentioned counterforce is exerted on the table 1, the receiving surface 281 of the swingable frame 207 is raised against the force of the spring 283, so that the urigng surface 281 functions as a guide to cause the frame 207 to be tilted and longitudinally displaced, with the pin 271b moving in the slot 271a relatively thereto toward the lower end thereof, until the supporting end 7a of the caster 7 reaches the retracted position A. In this position the main force expected to cause the caster 7 to project is provided by the spring 284. The force, however, is not so large as to overcome the counterforce from the floor F, so that projection of the caster 7 will not be caused to occur, and the table is kept stable in the restrained condition. When the table 1 in this condition is raised or otherwise moved to reduce the counterforce from the floor F, the swingable frame 207 is moved by its own weight and the force of the spring 284 to temporarily push the urging slider 282 to move the supporting end 7a onto the projecting position B.

Thus, with this arrangement just as in the previous embodiments, it is possible to place the table 1 selectively in the movable and restrained conditions without operating a lever at all and with a simple structure, so that the operability and easiness in handling the device have been greatly improved.

Fifth Embodiment

Figure 16:
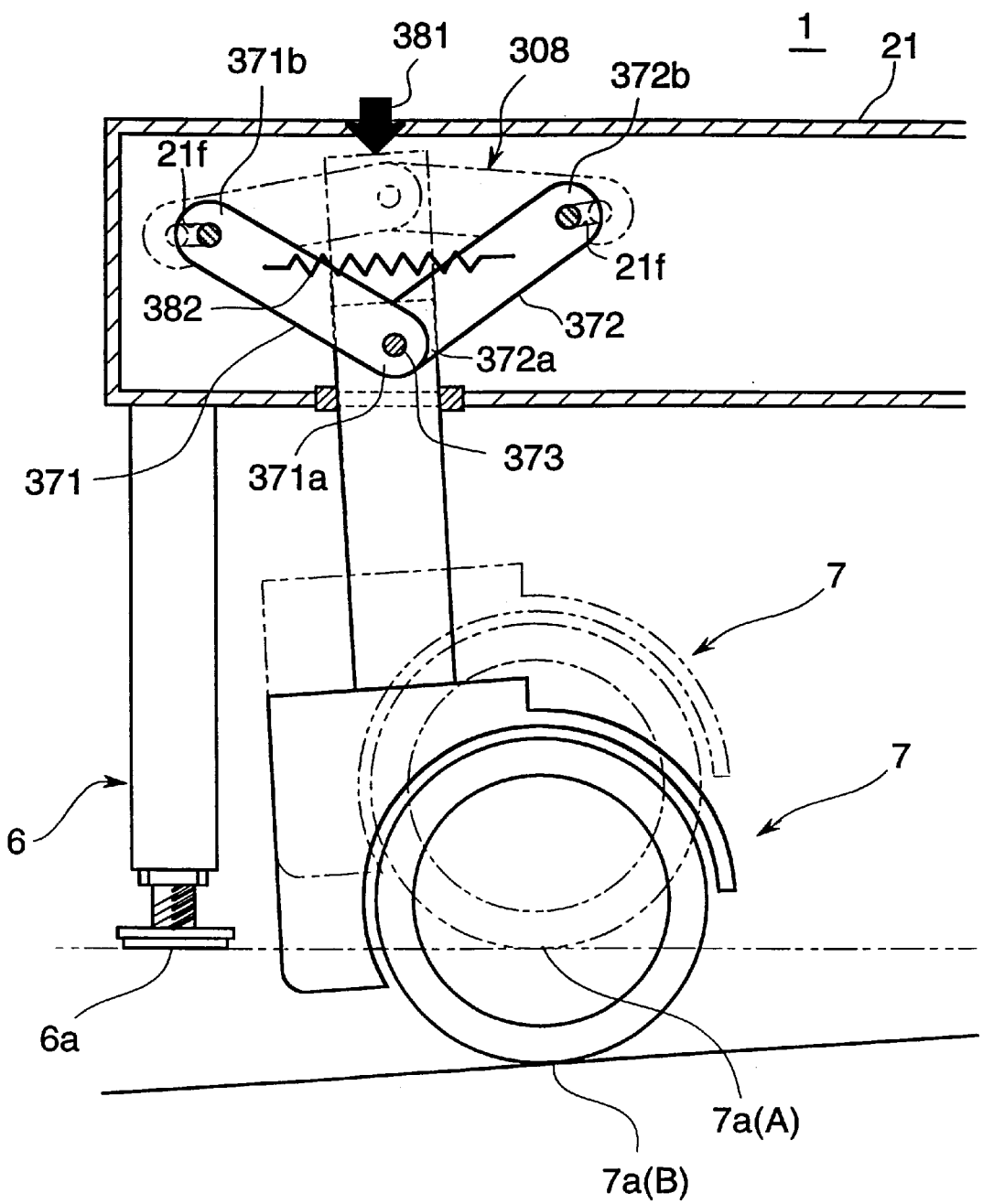
FIG. 16 is a side view, partly in section, of a fifth embodiment of the present invention.
Figure 17:
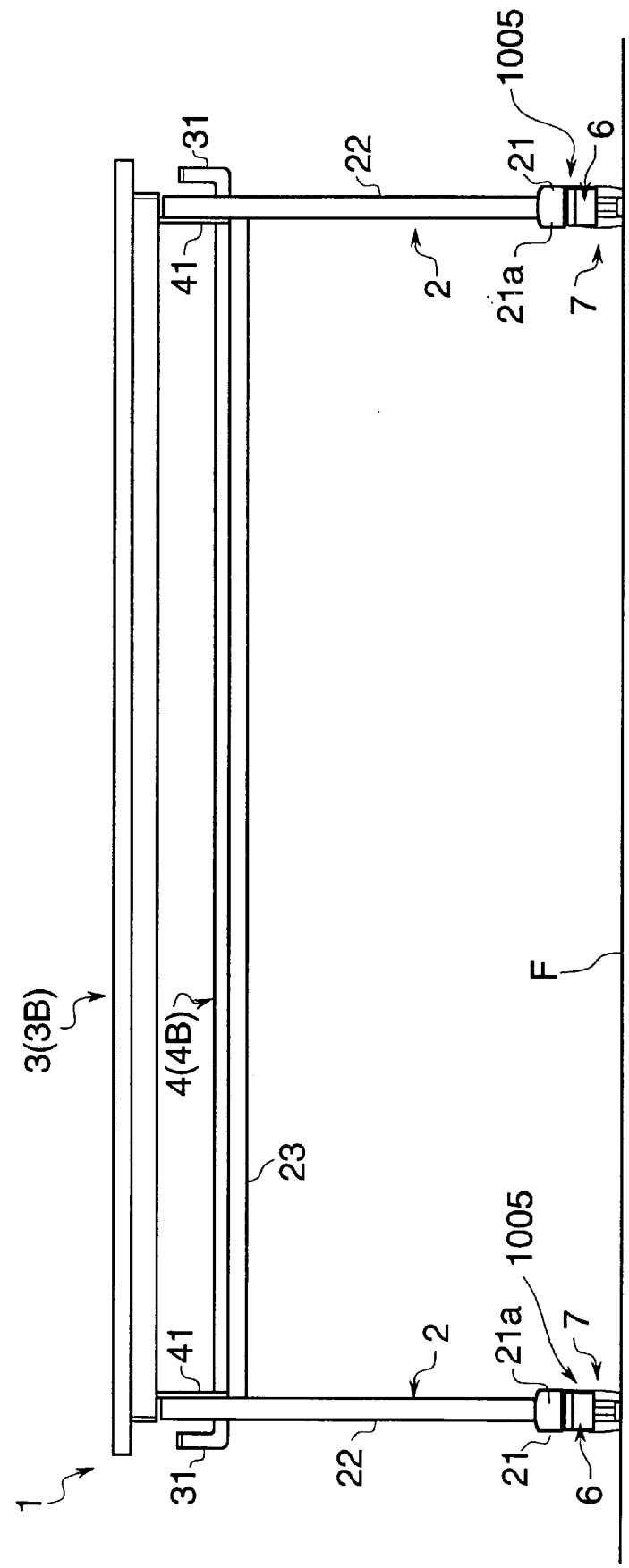
FIG. 17 is a front view of a foldable table to which a sixth embodiment of the present invention is applied.

In FIG. 16, the caster 7 that is the supporter for transport is supported by a pair of links 371 and 372 which are connected at one end 371a, 372a to each other and also to the caster 7 by a pivot pin 373, and at the other end 371b, 372b slidably supported by a pair of slots 21f formed in the base 21 of the table 1 so that the pivot pin 373 is movable to and away from the floor F. An urging mechanism 308 different from those in the previous embodiments is provided to support the table 1 in movable condition and alternatively in restrained condition by means of the links 371 and 372 and the caster 7.

The urging mechanism 308 comprises a first resilient member in the form of a first spring 381 for urging the pivot pin 373 toward the floor F and a second resilient member in the form of a second spring 382 for urging the links 371 and 372 in such a direction that the angle between the links 371 and 372 crossing at the pivot pin 373 decreases. While the supporting end 7a of the caster 7 is at or adjacent the projecting position B where it projects toward the floor F downwardly of the supporting end 6a of the adjuster 6, the sum of the urging forces of the first and second springs 381 and 382 which urges the caster 7 toward the floor F is greater than the gravity acting on the table 1. When the supporting end 7a of the caster 7 is at or adjacent the retracted position A where it at least contacts the floor F simultaneously with the supporting end 6a of the adjuster 6, the force of the first spring 381 from which the force of the second spring 382 is subtracted and which urges the caster 7 toward the floor F is smaller than the gravity acting on the table 1.

In this arrangement, while the supporting end 7a of the caster 7 is at the projecting position B, the first and second springs 381 and 382 overcome the counterforce from the floor F thereby to keep the table 1 stable in the movable condition. When an artificial load in the direction to increase the above-mentioned counterforce, the pivot point 373 is raised against the forces of the springs 381 and 382 to pass the change point where both the links 371 and 372 lie aligned with each other thereby to permit the caster 7 to move to the retrcted position A. Under the condition, since the second spring 382 acts in the direction to reduce the urging force of the first spring 381, the remaining force of the first spring 381 from which that of the second spring 382 has been subtracted acts on the caster 7 in the direction to project it. However, the remaining spring force is not great enough to overcome the previously mentioned counterforce, so that projection of the caster 7 is not caused to occur and the table 1 is kept stable in the restrained condition. When the table 1 in this condition is raised so as to reduce the counterforce from the floor F, the links 371 and 372 are moved past the previously mentioned change point by the weight of the caster 7 and the previously mentioned remaining urging force of the spring 381, so that the caster 7 is moved to the projecting position B.

Thus, with the above arrangement just as in the previous embodiments it is possible to place the table selectively under the movable and restrained conditions without operating a lever and with a simple structure, so that the operability and easiness in handling the device have been greatly improved.

Sixth Embodiment

In FIGS. 17 through 25, there is shown a table 1 of a construction similar to those in the previous embodiments. The corresponding components of the table 1 are designated by the same reference symbols and no description of the components will be given.

Figure 18:
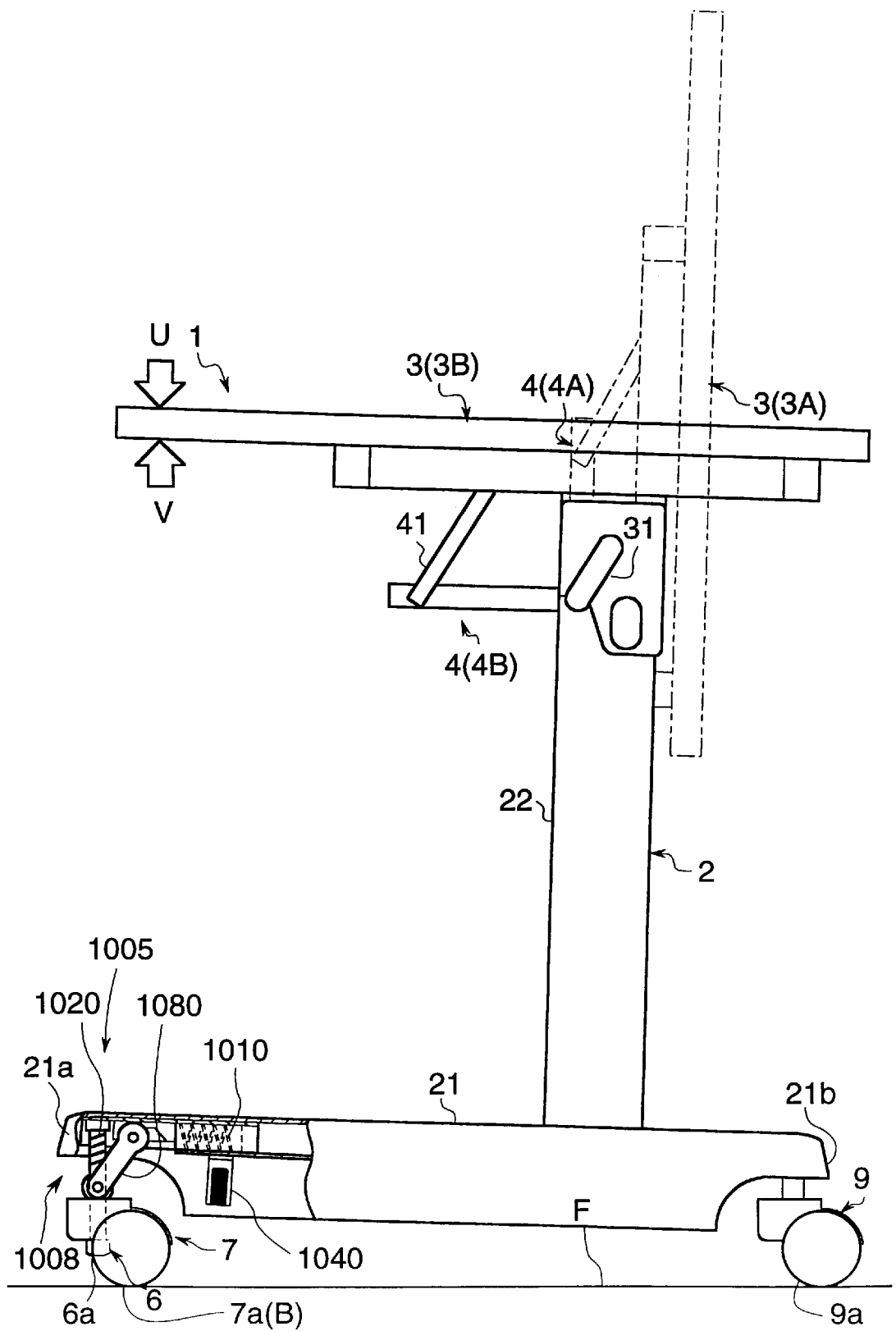
FIG. 18 is a side view of the table in the movable condition.
Figure 19:
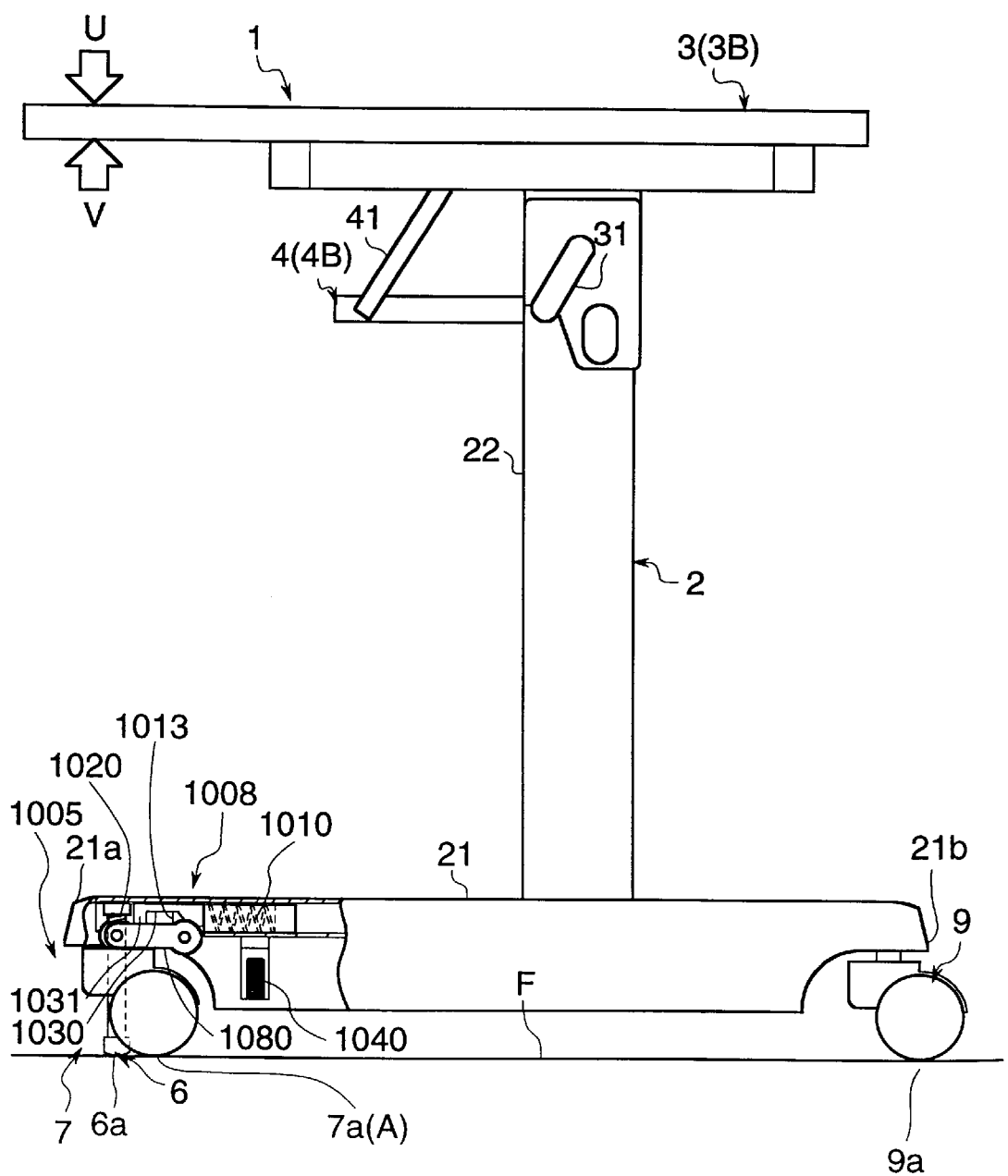
FIG. 19 is a side view of the table in the restrained condition.
Figure 20:
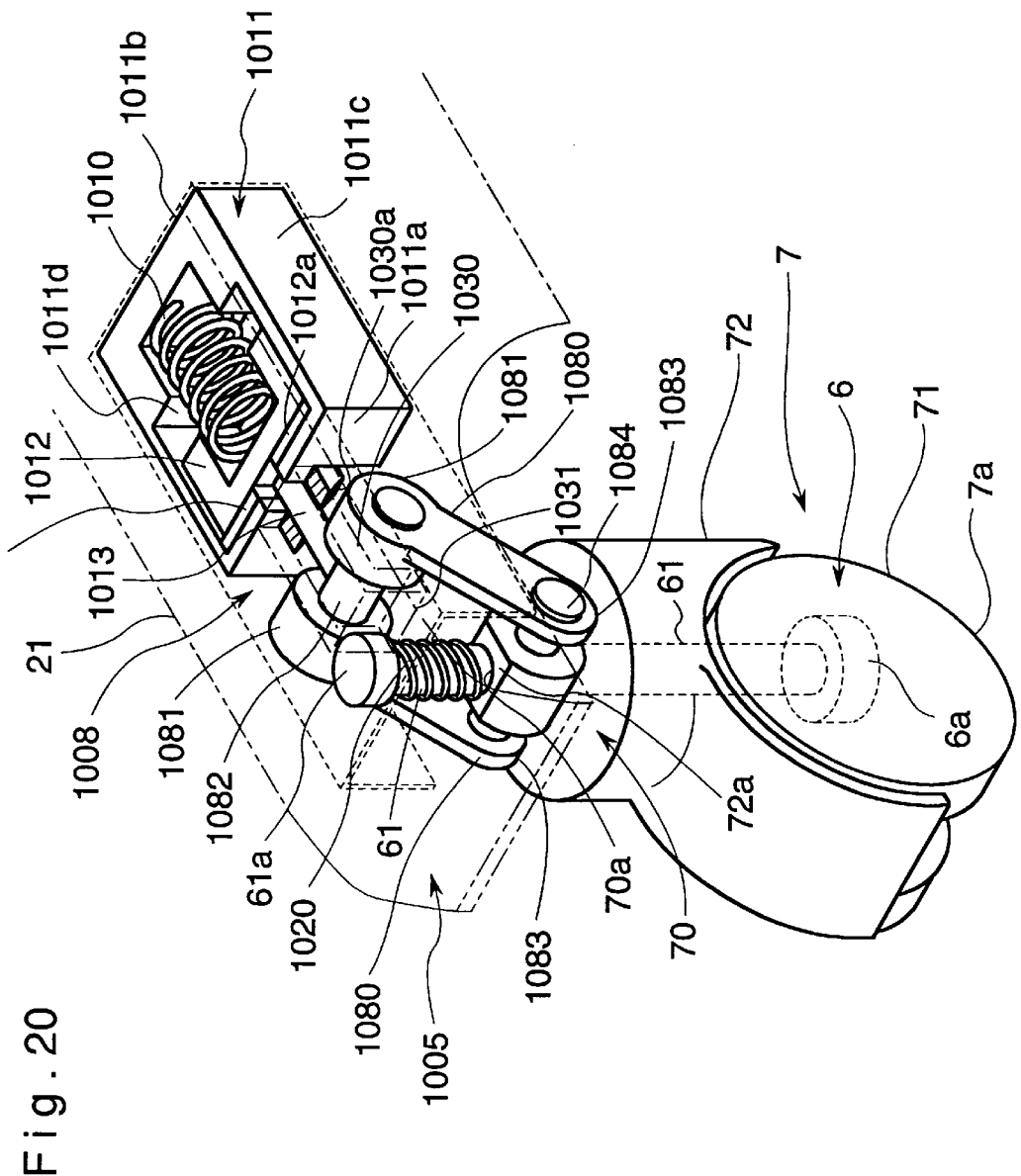
FIG. 20 is a perspective view, partly eliminated, of the table supporting device of the embodiment.
Figure 21:
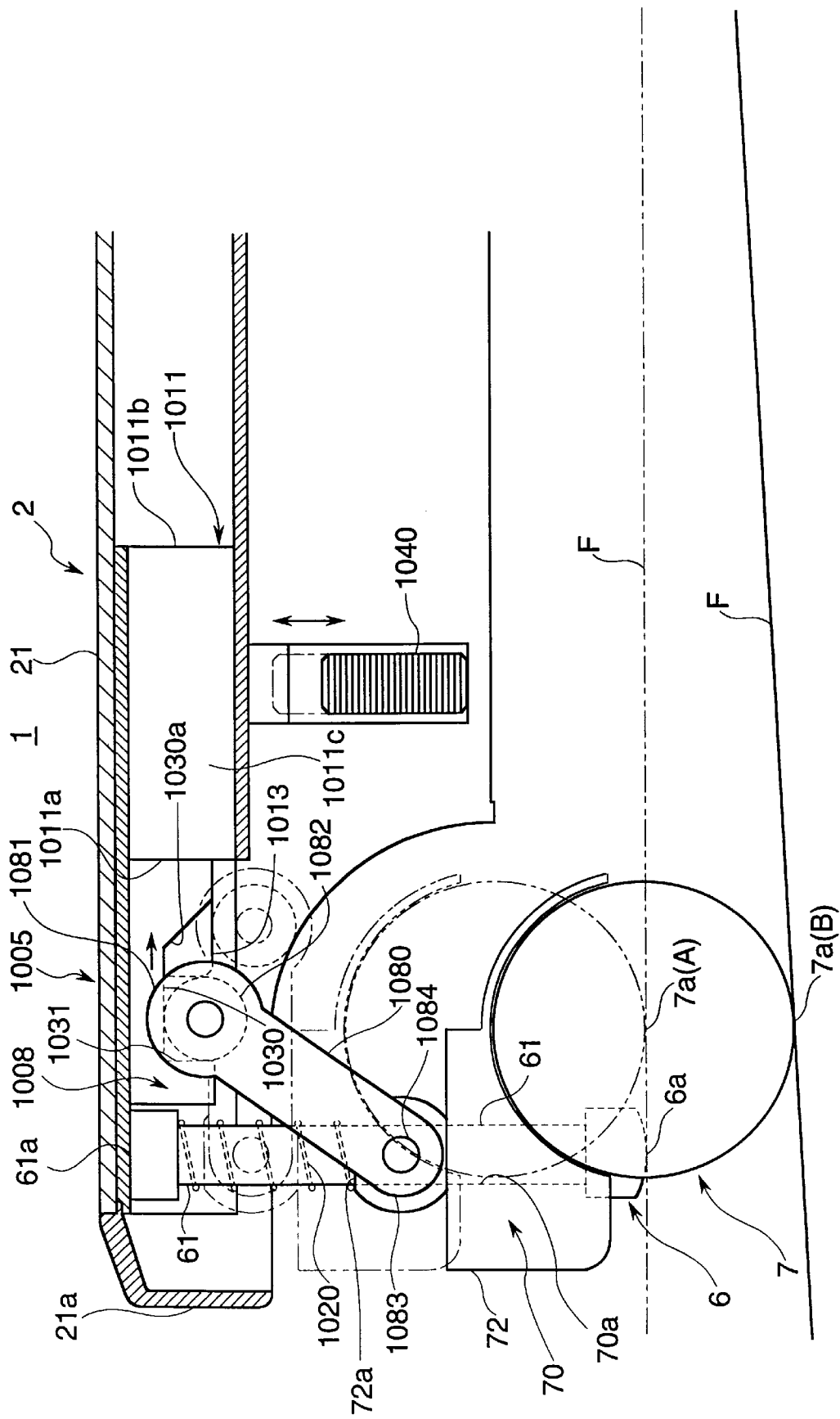
FIG. 21 is a side view, partly in section, of the device.
Figure 22:
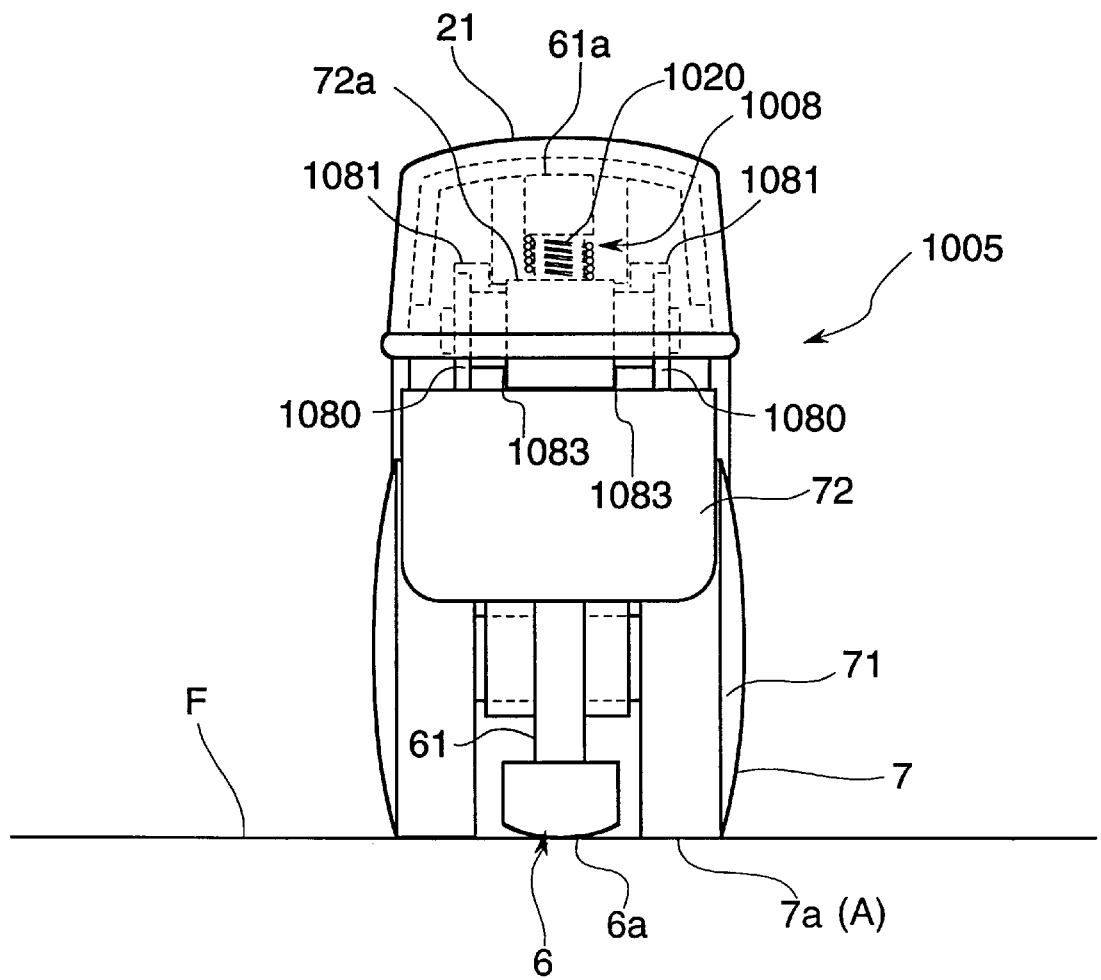
FIG. 22 is an enlarged front view of the principal portion of the device.
Figure 23:
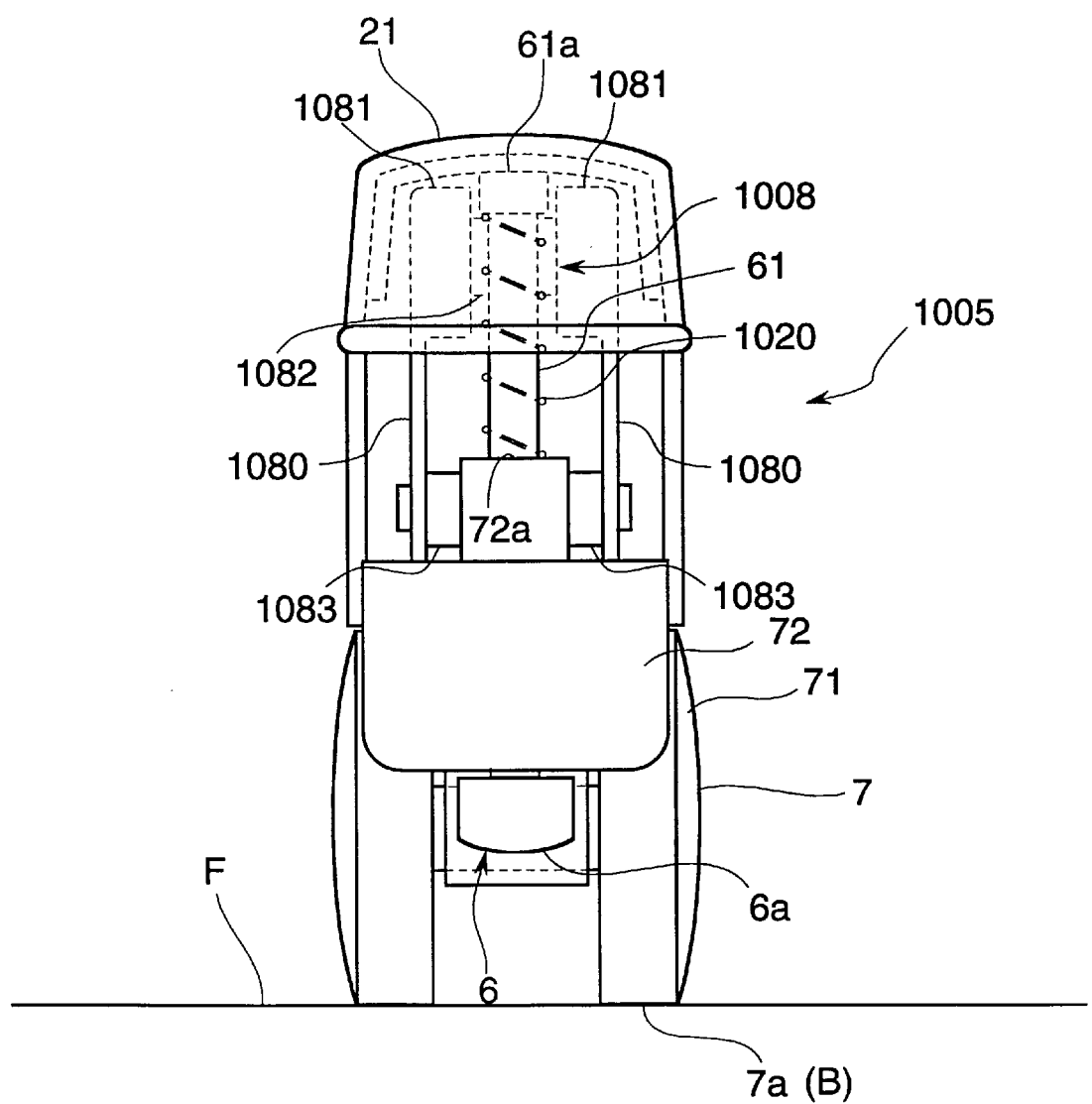
FIG. 23 is an enlarged front view of the principal portion of the device showing the operation thereof.
Figure 25:
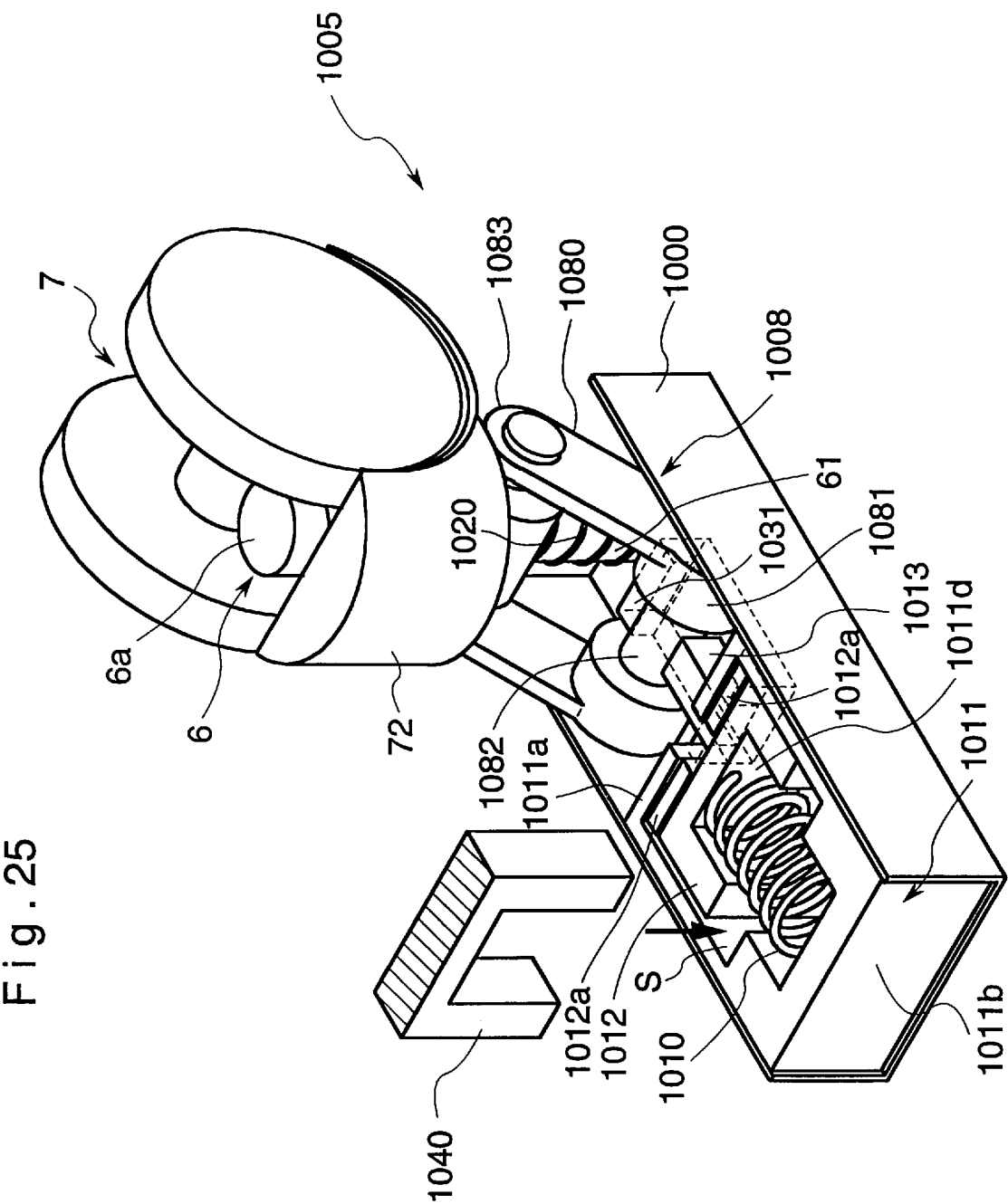
FIG. 25 is a perspective view of the principal portion of the embodiment.

The table supporting device 1005 is in the form of a cartridge fitted in a downwardly facing channel member 1000 as shown in FIG. 25, and comprises an adjuster 6 that is the supporter for restraint, a caster 7 that is the supporter for transport and an urging mechanism 1008 for urging the caster 7. As shown in FIGS. 20 and 21, the channel member 1000 is fixed to the forward end portion 21a of the base 21 lengthwise thereof, so that the table 1 may be supported selectively in the movable condition as shown in FIGS. 18, 20, 21 and 23 and in the restrained condition as shown in FIGS. 19, 21 and 22.

The adjuster 6 comprises a stem 61 having an upper end 61a fixed to the under surface of the upper wall of the channel member 1000 and a lower supporting end 6a adjustable in height by suitable means so as to be placed on the floor F thereby to support the table 1 in the restrained condition.

The caster 7 comprises a pair of rollers 71 and a holder 72 for holding the rollers 71 rotatably. In the holder there is formed a vertically piercing bore 70a, through which the stem 61 of the adjuster 6 is inserted, so that the stem 61 and the bore 70a form a guide 70 for guiding the caster 7 in such a manner that the caster 7 can be moved selectively to and away from the floor F. In particular, the caster 7 is movable along the stem 61 of the adjuster 6 between a retracted position A (see FIGS. 19 and 21) in which the supporting end 7a at least contacts the floor F simultaneously with the supporting end 6a of the adjuster 6 and a projecting position B (see FIGS. 18 and 21) in which the supporting end 7a projects toward the floor F downwardly of the supporting end 6a of the adjuster 6.

The urging mechanism 1008 comprises a pair of links 1080 provided between the caster 7 and the base 21, resilient means in the form of a first compression coil spring 1010 urging the ends 1081 of the links 1080 in such a direction that the caster 7 moves toward the floor F, and subsidiary resilient means in the form of a second compression coil spring 1020 urging the upper end 72a of the holder 72 in such a direction that the caster 7 moves toward the floor F. The second compression coil spring 1020 together with the gravity acting on the caster 7 forms the urging means of this invention for urging the caster 7 toward the floor F along the guide 70.

The pair of links 1080 are connected at one end 1081 by a pin 1082 to each other and pivoted at the opposite end 1083 by a pin 1084 to the upper end portion of the holder 72 of the caster 7. A kick spring not shown is disposed between the pin 1084 and the previously described holder 72, and on the under surface of the upper wall of the channel member 1000 there is formed a downwardly facing guide surface 1030, toward which the kick spring pushes the ends 1081 of the links 1080 by means of the pin 1082. A stopper 1031 depends from the front end of the downwardly facing guide surface 1030 and the pin 1082 is slidable along the downwardly facing surface 1030 as far as it hits the stopper 1031. In this embodiment, at or adjacent the position where the pin 1082 hits the stopper 1031 the supporting end 7a of the caster 7 is held at the projecting position B nearer to the floor F than the supporting end 6a of the adjuster 6.

The links 1080 have their ends 1081 free and do not limit the range of movement of the caster 7 but allow the supporting end 7a of the caster 7 to move to the retracted position A where the supporting end 7a at least contacts the floor F simultaneously with the supporting end 6a of the adjuster 6. A portion of the downwardly facing guide surface 1030 is formed into an inclined surface 1030a for guiding the pin 1082 gradually downwardly as the caster 7 moves from the projecting position B to the retracted position A thereby to cause the pin 1082 to slide along the downwardly facing surface 1030 in the direction of an arrow in FIG. 21.

Figure 24:
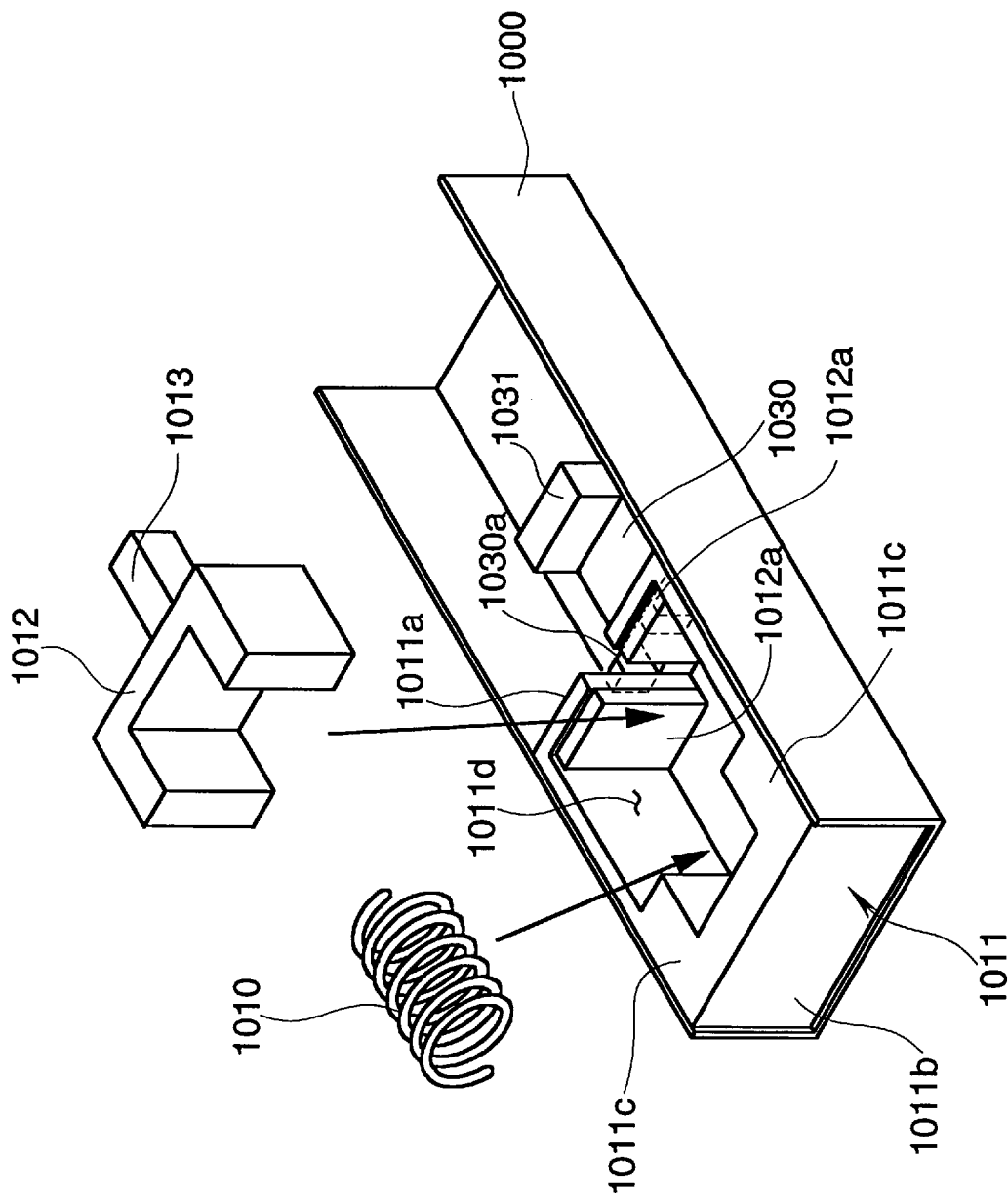
FIG. 24 is an exploded perspective view of the principal portion of the embodiment.

The first compression coil spring 1010 is fitted in a case 1011 fixed in the channel member 1000. In particular, as shown in FIG. 24 the case 1011 is formed of a synthetic resin integrally with the previously described stopper 1031 and the downwardly facing guide surface 1030, and has a spring containing space 1011d defined by a front wall 1011a, a rear wall 1011b and side walls 1011c, with the previously described first compression coil spring 1010 being arranged in the space 1011d so as to be able to be selectively expanded and compressed longitudinally of the base 21. As shown in FIGS. 20, 24 and 25, between the front end of the first compression coil spring 1010 and the front wall 1011a there is provided an actuator 1012 which is channel-shaped in a plan view and has a push rod 1013 projecting from the center thereof to pass through the front wall 1011a of the case 1011 and resiliently abut on the pin 1082 connecting the ends 1081 of the links 1080.

The second compression coil spring 1020 is wound about the stem 61 of the adjuster 6 and has its upper end in contact with the under surface of the upper wall of the channel member 1000 and the lower end in contact with the upper end 72a of the roller holder 72 of the caster 7 thereby to resiliently urge the caster 7 downwardly.

In this embodiment, while the supporting end 7a of the caster 7 is at or adjacent the projecting position B, the caster 7 is urged toward the floor F chiefly by the resilient urging force of the first compression coil spring 1010 transmitted to the caster 7 through the push rod 1013, the pin 1082 and the links 1080 and the resilient urging force of the second compression coil spring 1020 transmitted directly to the caster 7. In this embodiment, the sum of the urging forces is set so as to be greater than the gravity acting on the foldable table 1. While the supporting end 7a of the caster 7 is at or adjacent the retracted position A, the pin 1082 has been moved along the inclined surface 1030a to a position below the push rod 1013, where the pin 1082 has been released of the urging force of the first compression coil spring 1010, so that the caster 7 is urged toward the floor F chiefly by the resilient urging force which the second compression coil spring 1020 exerts directly on the caster 7. The urging force is set so as to be smaller than the gravity acting on the table 1. The relationship between the resilient urging force and the gravity acting on the table 1 is realized by selecting a relatively large spring force of the first compression coil spring 1010 and a relatively small spring force of the second compression coil spring 1020. Needless to say, the counterforce from the kick spring acts to urge the caster 7 to project, and the above selection is made with due consideration given to various other force relations.

In this embodiment, a stopper 1040 as shown in FIGS. 21 and 25 is removably fitted in a space S (see FIG. 25) formed in the case 1011 between the rear wall 1011b and the actuator 1012 that has advanced to the caster 7, so that the stopper 1040 prevents the actuator 1012 from being moved rearwardly thereby to keep the caster 7 fixed in the projecting position B. Also in this embodiment a caster 9 of a conventional structure is provided to support the rear end 21b of each base 21. The supporting end 9a of the caster 9 is so set as to support the base 21 horizontally when the supporting end 9a contacts the floor F simultaneously with the supporting end 6a of the adjuster 6.

The operation of this embodiment will now be described. When the supporting end 7a of the caster 7 is at the projecting position B shown in FIG. 21 where the supporting end 7a projects toward the floor F downwardly of the supporting end 6a of the adjuster 6, the supporting end 7a of the caster 7 contacts the floor F whereas the supporting end 6a of the adjuster 6 is off the floor F, so that the casters 7 and 9 support the table so as to be movable in a slightly rearwardly inclined position as shown in FIG. 18. In this position the caster 7 is urged by the urging mechanism 1008 toward the floor F with an urging force greater than the gravity acting on the table 1, so that despite the counterforce corresponding to the gravity the caster receives from the floor F, the supporting end 7a thereof is prevented from being retracted into the retracted position A thereby to keep the table 1 stable in the movable condition.

When a load in the direction shown by an arrow U in the drawing is placed on the table 1 in that position by pressing the table top 3 down by hand thereby to make the gravity on the table apparently greater than the force with which the caster 7 is urged to the floor F, the caster 7 receives a counterforce corresponding to the gravity so as to be moved to the retracted position A against the urging force of the urging mechanism 1008, whereupon the pin 1082 connecting the ends 1081 of the links 1080 is moved in the direction of an arrow shown in FIG. 21, so that the first and second compression coil springs 1010 and 1020 are compressed by the above-mentioned pin 1082 or the upper end 72a of the roller holder 72. As the operation proceeds, the pin 1082 is disengaged from the push rod 1013 transmitting the resiliency of the first compression coil spring 1010 to the pin 1082 immediately before the end of displacement, so that the pin 1082 is positioned below the push rod 1013, which is restored to its original position, whereupon the actuator 1012 abuts on a stopping plate 1012a provided inside the case 1011 thereby to stop the push rod 1013 at the projecting position. Having moved to the retracted position A as shown in FIG. 21, the supporting end 7a of the caster 7 at least contacts the floor F simultaneously with the supporting end 6a of the adjuster 6, so that the support of the table 1 is provided predominantly by the adjuster 6, which supports the table 1 in a restrained condition as shown in FIG. 19. Although the caster 7 in this position is still urged by the urging mechanism 1008 onto the floor F, the urging force in that position is smaller than the gravity acting on the table 1 as previously mentioned. As a result, despite the force of the urging mechanism 1008 urging the caster 7 into contact with the floor F, the force will not overcome the counterforce from the floor F corresponding to the gravity, so that the caster 7 will not be moved to the projecting position B but the restrained condition will be kept stable.

If the table 1 in this position is artificially moved in the direction of an arrow V shown in the drawing by raising the table top 3 by hand thereby to make the counterforce from the floor F corresponding to the gravity acting on the table 1 apparently smaller than the force with which the caster 7 is urged by the urging mechanism 1008 toward the floor F, projecting movement of the caster 7 is caused to occur by the urging force of the urging mechanism 1008, so that the pin 1082 moves in the direction opposite to the direction of the arrow in FIG. 21. At this time the pin 1082 moves along a different path from when the caster 7 is retracted, that is, the pin 1082 slides on the under surface of the push rod 1013 until it falls at the front end of the push rod 1013. When the supporting end 7a of the caster 7 has moved to the projecting position B in this manner, the urging force of the urging mechanism 1008 again exceeds the gravity on the table 1 thereby to keep the movable condition of the table 1 stable.

As described above, in the table supporting device 1005 of the embodiment of the invention, it is possible to cause the table 1 to change from the movable condition to the restrained condition by a mere action of a person leaning against the table top 3 or base 21 of the table 1, and from the restrained condition to the movable condition by a mere action of lifting a little the table top 3. This is possible without operating a lever at all, and the condition of the table can be changed by an operation following the flapping action of the table top 3, so that the convenience of handling the device of the invention is improved greatly as compared with the conventional locking devices. In addition, the table supporting device 1005 is structurally quite independent of the mechanism for flapping the table top 3, so that the construction becomes much simplified and the number of the manufacturing steps and the manufacturing cost are reduced as compared with the conventional devices in which the supporting device and the flapping mechanism are in ganged relation. Moreover, in the device of the invention, since the table supporting device 1005 can be kept in the movable condition with the table top 3 being held in the position 3B for use, various advantages can be obtained such that when many tables are to be arranged with the side edges of their table tops held in contact with each other, it is possible to arrange the tables with their table tops 3 held in the position 3B for use, and that since the table supporting device can be locked with the table top 3 held upright in the position 3A for nonuse, it is possible to store many tables stably in a smaller area than otherwise.

In this embodiment, the urging mechanism 1008 comprises the two compression coil springs 1010 and 1020, and the urging force available when the caster 7 is in the projecting position B is mainly provided by the first compression coil spring 1010 having a relatively strong spring force while the urging force available when the caster 7 is in the retracted position A is mainly provided by the second compression coil spring 1020 having a relatively weak spring force, so that it is very easy to set the components in order to obtain the above-mentioned functions, and since it is possible to use the springs 1010 and 1020 in proper positions, exact operation and reliability of the device can be secured for a long time.

In this embodiment, as the caster 7 is retracted, when the ends 1081 of the links 1080 have moved a certain distance, the pin 1082 is disengaged from the front end of the push rod 1013, whereupon the actuator 1012 is returned to the original position abutting on the plate 1012a. In this arrangement, when the table 1 is pushed down by hands placed on the table top 3, the operator can exactly know the action of the mechanism by the feeling through his or her hands as well as the sounds produced by the pin 1082 disengaged from the push rod 1013 and the actuator 1012 hitting the plate 1012a, and when the table top 3 is raised in order to make the caster 7 project, the operator can clearly know the projection by the sound produced by the pin 1082 falling in front of the push rod 1013, so that the operation can be performed exactly with a good feeling in operation.

When the caster 7 is in the projecting position B, if necessary, the stopper 1040 may be inserted in place to lock the caster 7 in the position, so that the operability and safety in such a work as moving the table are effectively improved.

Further, in this embodiment, as the adjuster 6, the caster 7 and the urging mechanism 1008 constituting the table supporting device 1005 are assembled as a cartridge in the channel member 1000, the whole device 1005 can be made compact with increased convenience in fixing the device in place, and the device can be removed with ease for adjustment, repair or exchange.

The concrete constructions of the component parts are not limited to those in the illustrated embodiments, but there may be various changes without departing from the concept and scope of the invention. For example, in the above sixth embodiment the urging means for urging the caster 7 toward the floor F along the guide 70 is composed of the gravity acting on the caster 7 itself and additionally the second compression coil spring 1020 that is the subsidiary resilient member. A suitable design, however, will make it possible to eliminate the second compression coil spring 1020 and make the gravity alone perform the same function as in the above embodiment. Also in the above embodiment, the base 21 is provided at the rear end 21b thereof with a caster 9 of a conventional construction. Of course the rear end 21b may also be supported by the table supporting device 1005 of the invention just as is the case with the front end 21a thereof.

Applicability in Industry

As described above, the object supporting device of the invention is useful as means for supporting various types of office furniture such as conference tables, and especially effective when applied to a type provided with a top plate operable like a flap. The device of the invention can of course be effectively used as means for supporting pieces of furniture for use in other places than offices or objects other than furniture.

We claim:

1. An object supporting device for supporting an object to be supported selectively in a restrained condition and in a movable condition comprising:

a supporter for restraint adapted to be fixed to the object to be supported and having a supporting end adapted to contact a supporting plane on which the object is to be supported so as to support the object in the restrained condition;

a supporter for transport having a supporting end, the supporter for transport mountable on the object to be supported so as to be movable between a retracted position in which the supporting end of the supporter for transport at least contacts the supporting plane simultaneously with the supporting end of the supporter for restraint and a projecting position in which the supporting end of the supporter for transport projects toward the supporting plane farther than the supporting end of the supporter for restraint; and an urging mechanism for urging the supporter for transport at or adjacent the projecting position toward the supporting plane with a force greater than the gravity acting on the object being supported and at or adjacent the retracted position with a force smaller than the gravity acting thereon, the urging mechanism adapted to move the supporter for transport from the projected position into the retracted position in response to the object to be supported being raised.

2. The object supporting device described in claim 1 wherein the supporter for transport is mountable on the object to be supported through a guide by which the supporter for transport is movable to and away from the supporting plane; and that the urging mechanism comprises: a link having a first end and a second end, the link adapted to be connected at its first end to the object to be supported so as to be pivotally movable and slidable relative thereto and at its second end to the supporter for transport so as to keep the supporter for transport movable between the projecting and retracted positions; and a resilient biasing device for urging the first or second end of the link in such a direction that the supporter for transport approaches the supporting plane; whereby the force with which the resilient biasing device urges the supporter for transport toward the supporting plane when the supporter for transport is at or adjacent the projecting position is adapted to be greater than the gravity acting on the object being supported, and the force with which the resilient biasing device urges the supporter for transport toward the supporting plane through the link when the supporter for transport is at or adjacent the retracted position is adapted to be smaller than the gravity acting on the object being supported.

3. The object supporting device described in claim 1 wherein the supporter for transport is supported by a supporting arm adapted to be pivotally connected to the object to be supported, and the urging mechanism includes a first and a second cam surface formed on the pivotal supporting arm, an urging arm having a cam follower and adapted to be pivotally connected to the object to be supported in such a manner that when the supporter for transport is at or adjacent the projecting position, the cam follower slidably contacts the first cam surface and when the supporter for transport is at or adjacent the retracted position, the cam follower slidably contacts the second cam surface; and a resilient biasing device for urging the urging arm; the first and second cam surfaces having different angles such that the force with which the resilient biasing device urges the supporter for transport toward the supporting plane through the pivotal supporting arm when the first cam surface is urged through the cam follower of the urging arm is adapted to be greater than the gravity acting on the object being supported, and the force with which the resilient biasing device urges the supporter for transport toward the supporting plane through the pivotal supporting arm when the second cam surface is urged through the cam follower of the urging arm is smaller than the gravity acting on the object being supported.

4. The object supporting device described in claim 1 wherein the supporter for transport is fixed to a vertically movable rod adapted to be provided on the object to be supported, and the urging mechanism includes a cam formed on a portion of the vertically movable rod, an urging member having an outer end portion, the urging member adapted to be pivotally mounted on the object to be supported and having its outer end portion disposed in the path which the cam follows as the vertically movable rod moves up and down, and a resilient biasing device urging the urging member, whereby the force which urges the supporter for transport toward the supporting plane through the cam disposed at a position where the cam is urged by the outer end of the urging member when the support for transport is at or adjacent the projecting position is adapted to be greater than the gravity acting on the object being supported, and the force which urges the supporter for transport toward the supporting plane with the cam being disposed at a position where the cam is not urged by the outer end of the urging member when the supporter for transport is at or adjacent the retracted position is adapted to be smaller than the gravity acting on the object being supported, and as the supporter for transport is moved from the retracted position to the projecting position without being influenced by the gravity acting on the object being supported, the cam urges the outer end portion of the urging member so that the outer end portion is temporarily moved out of the path of the cam.

5. The object supporting device described in claim 1 wherein the supporter for transport is fixed to a swingable frame adapted to be mounted to the object to be supported through engaging means comprising slots and pins, and the urging mechanism includes a receiving surface formed on a portion of the swingable frame, a slider that contacts the receiving surface when the supporter for transport is at or adjacent the projecting position, and a resilient biasing device for urging the slider, whereby the slider urges the supporter for transport toward the supporting plane through the receiving surface when the supporter for transport is at or adjacent the projecting position with a force that is adapted to be greater than the gravity acting on the object being supported, and the force which urges the supporter for transport toward the supporting plane with the receiving surface being disposed so as not to be urged by the slider when the supporter for transport is at or adjacent the retracted position is adapted to be smaller than the gravity acting on the object being supported, and as the supporter for transport is moved from the retracted position to the projecting position without being influenced by the gravity acting on the object being supported, the receiving surface of the swingable frame is restored to the position where the receiving surface of the swingable frame is restored to the position where the receiving surface of the swingable frame is urged by the slider.

6. The object supporting device described in claim 1 further comprising a first and a second link, each link having first and second ends, said first and second links are pivotally connected to each other at their first ends and adapted to be slidably connected to the object to be supported at their second ends so that the pivot point between the first and second link is movable to and away from the supporting plane and the supporter for transport is supported at the pivot point of the links, and that the urging mechanism includes a first resilient biasing member for urging the pivot point toward the supporting plane and a second resilient biasing member for urging the links in such a direction that the angle between the links decreases, whereby when the supporter for transport is at or adjacent the projecting position, the sum of the urging forces of the first and second resilient biasing members serves as a force to urge the supporter for transport in the direction to the supporting plane, which force is adapted to be greater than the gravity acting on the object being supported, and when the supporter for transport is at or adjacent the retracted position, the difference between the urging forces of the first and second resilient biasing members serves as a force to urge the supporter for transport in the direction to the supporting plane by a force adapted to be smaller than the gravity acting on the object being supported.

7. The object supporting device described in claim 1 wherein the supporter for transport is adapted to be coupled to the object to be supported by guide means through which the supporter for transport is movable to and away from the supporting plane; the urging mechanism includes a link having first and second ends, the first end of the link slidable along a downwardly facing surface formed on the object to be supported and the second end pivotally connected to the supporter for transport, a resilient biasing device for urging the in such a direction that the supporter for transport approaches the supporting plane, and urging means for urging the supporter for transport along with the guide means in such a direction that the supporter for transport approaches the supporting plane; and that the force with which the resilient biasing device and urging means urge the supporter for transport toward the supporting plane through the link when the supporter for transport is at or adjacent the projecting position is greater than the gravity acting on the object being supported, and the force with which the resilient biasing device and urging means urge the supporter for transport toward the supporting plane through the link when the supporter for transport is at or adjacent the retracted position is adapted to be smaller than the gravity acting on the object being supported.

8. The object supporting device described in claim 7 wherein the urging means is provided with a subsidiary resilient biasing member for urging the upper end of the supporter for transport along the guide.

9. The object supporting device described in claim 8 wherein the downwardly facing surface is formed with an inclined surface for guiding the first end of the link in a direction as to get out of the influence of the urging force of the resilient biasing device as the supporter for transport is moved from the projecting position to the retracted position.

10. The object supporting device described in claim 8 wherein a kick spring is provided at the pivot point of the second end of the link and the supporter for transport for pressing the first end of the link onto the downwardly facing surface.

11. The object supporting device described in claim 8 wherein the supporter for restraint, the support for transport and the urging mechanism are formed with the guide into a cartridge mountable to the object to be supported.

12. The object supporting device described in claim 7 wherein the downwardly facing surface is formed with an inclined surface for guiding the first end of the link in a direction as to get out of the influence of the urging force of the resilient biasing device as the supporter for transport is moved from the projecting position to the retracted position.

13. The object supporting device described in claim 12 wherein the supporter for restraint, the support for transport and the urging mechanism are formed with the guide into a cartridge mountable to the object to be supported.

14. The object supporting device described in claim 7 wherein a kick spring is provided at the pivot point of the second end of the link and the supporter for transport for pressing the first end of the link onto the downwardly facing surface.

15. The object supporting device described in claim 14 wherein the supporter for restraint, the support for transport and the urging mechanism are formed with the guide into a cartridge mountable to the object to be supported.

16. The object supporting device described in claim 7 wherein the supporter for restraint, the supporter for transport and the urging mechanism are formed with the guide into a cartridge mountable to the object to be supported.

17. The object supporting device described in claim 7 wherein the supporter for transport is a caster supported by the supporter for restraint.

18. The object supporting device described in claim 1 wherein the supporter for transport is a caster supported by the supporter for restraint.

19. The object supporting device described in claim 1 wherein the supporter for restraint is an adjuster for supporting the object to be supported at an adjustable height.

20. The object supporting device described in claim 1, in combination with the object to be supported, wherein the object to be supported includes a foldable table having a top which is operable to be folded between a horizontal use position and a non-use upright position.

21. An object supporting device for supporting an object to be supported selectively in a restrained condition and in a movable condition, comprising: a supporter for restraint adapted to be fixed to the object to be supported and having a supporting end adapted to contact a supporting plane on which the object is to be supported so as to support the object in the restrained condition; a supporter for transport having a supporting end, the supporter for transport adapted to be mounted on the object to be supported so as to be movable between a retracted position in which the supporting end of the supporter for transport at least contacts the supporting plane simultaneously with the supporting end of the supporter for restraint and a projecting position in which the supporting end of the supporter for transport projects toward the supporting plane farther than the supporting end of the supporter for restraint; and an urging mechanism for urging the supporter for transport at or adjacent the projecting position toward the supporting plane with a force greater than the gravity acting on the object being supported and at or adjacent the retracted position with a force smaller than the gravity acting thereon, wherein the supporter for transport is adapted to be mounted on the object to be supported through guide means by which the supporter for transport is movable to and away from the supporting plane; and that the urging mechanism includes link means having a first end and a second end, the link means adapted to be connected at its first end to the object to be supported so as to be pivotally movable and slidable relative thereto and at its second end to the supporter for transport so as to keep the supporter for transport movable between the projecting and retracted positions; and resilient biasing means for urging the first end of the link means in such a direction that the support for transport approaches the supporting plane; whereby the force with which the resilient biasing means urges the supporter for transport toward the supporting plane when the supporter for transport is at or adjacent the projecting position is adapted to be greater than the gravity acting on the object being supported, and the force with which the resilient biasing means urges the supporter for transport toward the supporting plane through the link means when the supporter for transport is at or adjacent the retracted position is adapted to be smaller than the gravity acting on the object being supported.

\* \* \* \* \*

UNITED STATES PATENT AND TRADEMARK OFFICE
CERTIFICATE OF CORRECTION

PATENT NO.: 5,944,291

DATED: August 31, 1999

INVENTOR(S): Yoshimasa KATO, *et al.*

It is certified that these errors appear in the above-identified patent and that said Letters Patent is hereby corrected as shown below:

Title page,
  In Item [56] References Cited, first reference listed:
       Delete "Thomas" and insert --Thomes--.

In Claim 3, column 18, line 50:
       After "is" insert --adapted to be--.

In Claim 7, column 20, line 5:
       After "the" (first occurrence) insert --first end of the link--.

In Claim 11, column 20, line 36:
       Delete "support" and insert --supporter--.

In Claim 13, column 20, line 46:
       Delete "support" and insert --supporter--.

In Claim 15, column 20, line 55:
       Delete "support" and insert --supporter--.

Signed and Sealed this

Seventeenth Day of October, 2000

Attest:

Q. TODD DICKINSON

*Attesting Officer*      *Director of Patents and Trademarks*